US012080314B2

(12) United States Patent
Shih

(10) Patent No.: US 12,080,314 B2
(45) Date of Patent: *Sep. 3, 2024

(54) DYNAMIC PLAYER SELECTION FOR AUDIO SIGNAL PROCESSING

(71) Applicant: Sonos, Inc., Santa Barbara, CA (US)

(72) Inventor: Shao-Fu Shih, Boston, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,976

(22) Filed: Dec. 27, 2022

(65) Prior Publication Data

US 2023/0215452 A1 Jul. 6, 2023

Related U.S. Application Data

(63) Continuation of application No. 17/486,222, filed on Sep. 27, 2021, now Pat. No. 11,545,169, which is a (Continued)

(51) Int. Cl.
*G10L 21/0216* (2013.01)
*G06F 3/16* (2006.01)
(Continued)

(52) U.S. Cl.
CPC .......... *G10L 21/0216* (2013.01); *G06F 3/162* (2013.01); *G10L 15/22* (2013.01); (Continued)

(58) Field of Classification Search
CPC . G10L 21/0216; G10L 15/22; G10L 21/0208; G10L 21/0264; G10L 2015/223;
(Continued)

(56) References Cited

U.S. PATENT DOCUMENTS

| 999,715 A | 8/1911 | Gundersen |
| 5,717,768 A | 2/1998 | Laroche |

(Continued)

FOREIGN PATENT DOCUMENTS

| CN | 1748250 A | 3/2006 |
| CN | 1781291 A | 5/2006 |

(Continued)

OTHER PUBLICATIONS

Notice of Allowance mailed on Jul. 18, 2022, issued in connection with U.S. Appl. No. 17/222,151, filed Apr. 5, 2021, 5 pages.
(Continued)

*Primary Examiner* — Jason R Kurr

(57) ABSTRACT

In one aspect, a first playback device is configured to (i) receive a set of voice signals, (ii) process the set of voice signals using a first set of audio processing algorithms, (iii) identify, from the set of voice signals, at least two voice signals that are to be further processed, (iv) determine that the first playback device does not have a threshold amount of computational power available, (v) receive an indication of an available amount of computational power of a second playback device, (vi) send the at least two voice signals to the second playback device, (vii) cause the second playback device to process the at least two voice signals using a second set of audio processing algorithms, (viii) receive, from the second playback device, the processed at least two voice signals, and (ix) combine the processed at least two voice signals into a combined voice signal.

20 Claims, 9 Drawing Sheets

Related U.S. Application Data continuation of application No. 16/927,670, filed on Jul. 13, 2020, now Pat. No. 11,133,018, which is a continuation of application No. 16/444,975, filed on Jun. 18, 2019, now Pat. No. 10,714,115, which is a continuation of application No. 15/959,907, filed on Apr. 23, 2018, now Pat. No. 10,332,537, which is a continuation of application No. 15/178,180, filed on Jun. 9, 2016, now Pat. No. 9,978,390.

(51) Int. Cl.
*G10L 15/22* (2006.01)
*G10L 21/0208* (2013.01)
*G10L 21/0264* (2013.01)
*H04R 3/00* (2006.01)
*H04R 27/00* (2006.01)
*H04W 24/02* (2009.01)

(52) U.S. Cl.
CPC ...... *G10L 21/0208* (2013.01); *G10L 21/0264* (2013.01); *H04R 3/005* (2013.01); *H04R 27/00* (2013.01); *G10L 2015/223* (2013.01); *G10L 2021/02082* (2013.01); *G10L 2021/02166* (2013.01); *H04R 2227/003* (2013.01); *H04R 2227/005* (2013.01); *H04R 2227/009* (2013.01); *H04W 24/02* (2013.01)

(58) Field of Classification Search
CPC ........... G10L 2021/02082; G10L 2021/02166; H04R 3/005; H04R 27/00; H04R 2227/003; H04R 2227/005; H04R 2227/009; H04W 24/02
See application file for complete search history.

(56) References Cited

U.S. PATENT DOCUMENTS

| | | |
|---|---|---|
| 5,857,172 A | 1/1999 | Rozak |
| 6,070,140 A | 5/2000 | Tran |
| 6,219,645 B1 | 4/2001 | Byers |
| 6,937,977 B2 | 8/2005 | Gerson |
| 7,103,542 B2 | 9/2006 | Doyle |
| 7,516,068 B1 | 4/2009 | Clark |
| 7,705,565 B2 | 4/2010 | Patino et al. |
| 8,085,947 B2 | 12/2011 | Haulick et al. |
| 8,233,632 B1 | 7/2012 | MacDonald et al. |
| 8,325,909 B2 | 12/2012 | Tashev et al. |
| 8,473,618 B2 | 6/2013 | Spear et al. |
| 8,594,320 B2 | 11/2013 | Faller |
| 8,620,232 B2 | 12/2013 | Helsloot |
| 8,639,214 B1 | 1/2014 | Fujisaki |
| 8,676,273 B1 | 3/2014 | Fujisaki |
| 8,762,156 B2 | 6/2014 | Chen |
| 8,898,063 B1 | 11/2014 | Sykes et al. |
| 9,002,024 B2 | 4/2015 | Nakadai et al. |
| 9,047,857 B1 | 6/2015 | Barton |
| 9,070,367 B1 | 6/2015 | Hoffmeister et al. |
| 9,088,336 B2 | 7/2015 | Mani et al. |
| 9,098,467 B1 | 8/2015 | Blanksteen et al. |
| 9,183,845 B1 | 11/2015 | Gopalakrishnan et al. |
| 9,208,785 B2 | 12/2015 | Ben-David et al. |
| 9,313,317 B1 | 4/2016 | Lebeau et al. |
| 9,354,687 B2 | 5/2016 | Bansal et al. |
| 9,368,105 B1 | 6/2016 | Freed et al. |
| 9,491,033 B1 | 11/2016 | Soyannwo et al. |
| 9,514,747 B1 | 12/2016 | Bisani et al. |
| 9,532,139 B1 | 12/2016 | Lu et al. |
| 9,542,941 B1 | 1/2017 | Weksler et al. |
| 9,558,755 B1 | 1/2017 | Laroche et al. |
| 9,632,748 B2 | 4/2017 | Faaborg et al. |
| 9,640,194 B1 | 5/2017 | Nemala et al. |
| 9,672,812 B1 | 6/2017 | Watanabe et al. |
| 9,691,384 B1 | 6/2017 | Wang et al. |
| 9,706,320 B2 | 7/2017 | Starobin et al. |
| 9,749,738 B1 | 8/2017 | Adsumilli et al. |
| 9,756,422 B2 | 9/2017 | Paquier et al. |
| 9,767,786 B2 | 9/2017 | Starobin et al. |
| 9,779,725 B2 | 10/2017 | Sun et al. |
| 9,781,532 B2 | 10/2017 | Sheen |
| 9,799,330 B2 | 10/2017 | Nemala et al. |
| 9,812,128 B2 | 11/2017 | Mixter et al. |
| 9,818,407 B1 | 11/2017 | Secker-Walker et al. |
| 9,865,264 B2 | 1/2018 | Gelfenbeyn et al. |
| 9,875,740 B1 | 1/2018 | Kumar et al. |
| 9,898,250 B1 | 2/2018 | Williams et al. |
| 9,899,021 B1 | 2/2018 | Vitaladevuni et al. |
| 9,972,343 B1 | 5/2018 | Thorson et al. |
| 9,992,642 B1 | 6/2018 | Rapp et al. |
| 10,028,069 B1 | 7/2018 | Lang |
| 10,038,419 B1 | 7/2018 | Elliot et al. |
| 10,115,400 B2 | 10/2018 | Wilberding |
| 10,134,398 B2 | 11/2018 | Sharifi |
| 10,134,399 B2 | 11/2018 | Lang et al. |
| 10,152,969 B2 | 12/2018 | Reilly et al. |
| 10,186,276 B2 | 1/2019 | Dewasurendra et al. |
| 10,204,624 B1 | 2/2019 | Knudson et al. |
| 10,249,205 B2 | 4/2019 | Hammersley et al. |
| 10,304,440 B1 | 5/2019 | Panchapagesan et al. |
| 10,304,475 B1 | 5/2019 | Wang et al. |
| 10,318,236 B1 | 6/2019 | Pal et al. |
| 10,332,508 B1 | 6/2019 | Hoffmeister |
| 10,354,658 B2 | 7/2019 | Wilberding |
| 10,424,296 B2 | 9/2019 | Penilla et al. |
| 10,565,999 B2 | 1/2020 | Wilberding |
| 10,565,998 B2 | 2/2020 | Wilberding |
| 10,586,534 B1 | 3/2020 | Argyropoulos et al. |
| 10,593,328 B1 | 3/2020 | Wang et al. |
| 10,593,330 B2 | 3/2020 | Sharifi |
| 10,699,711 B2 | 6/2020 | Reilly |
| 10,720,173 B2 | 7/2020 | Freeman et al. |
| 10,735,870 B2 | 8/2020 | Ballande et al. |
| 10,746,840 B1 | 8/2020 | Barton et al. |
| 10,777,203 B1 | 9/2020 | Pasko |
| 10,789,041 B2 | 9/2020 | Kim et al. |
| 10,824,682 B2 | 11/2020 | Alvares et al. |
| 10,825,471 B2 | 11/2020 | Walley et al. |
| 10,837,667 B2 | 11/2020 | Nelson et al. |
| 10,847,137 B1 | 11/2020 | Mandal et al. |
| 10,847,164 B2 | 11/2020 | Wilberding |
| 10,867,604 B2 | 12/2020 | Smith et al. |
| 10,871,943 B1 | 12/2020 | D'Amato et al. |
| 10,878,811 B2 | 12/2020 | Smith et al. |
| 10,964,314 B2 | 3/2021 | Jazi et al. |
| 11,024,311 B2 | 6/2021 | Mixter et al. |
| 11,025,569 B2 | 6/2021 | Lind et al. |
| 11,050,615 B2 | 6/2021 | Mathews et al. |
| 11,062,705 B2 | 7/2021 | Watanabe et al. |
| 11,100,923 B2 | 8/2021 | Fainberg et al. |
| 11,137,979 B2 | 10/2021 | Plagge |
| 11,138,969 B2 | 10/2021 | D'Amato |
| 11,159,878 B1 | 10/2021 | Chatlani et al. |
| 11,172,328 B2 | 11/2021 | Soto et al. |
| 11,172,329 B2 | 11/2021 | Soto et al. |
| 11,175,880 B2 | 11/2021 | Liu et al. |
| 11,184,704 B2 | 11/2021 | Jarvis et al. |
| 11,206,052 B1 | 12/2021 | Park et al. |
| 11,212,612 B2 | 12/2021 | Lang et al. |
| 11,264,019 B2 | 3/2022 | Bhattacharya et al. |
| 11,277,512 B1 | 3/2022 | Leeds et al. |
| 11,315,556 B2 | 4/2022 | Smith et al. |
| 11,354,092 B2 | 6/2022 | D'Amato et al. |
| 11,361,763 B1 | 6/2022 | Maas et al. |
| 11,373,645 B1 | 6/2022 | Mathew et al. |
| 11,411,763 B2 | 8/2022 | Mackay et al. |
| 11,445,301 B2 | 9/2022 | Park et al. |
| 11,514,898 B2 | 11/2022 | Millington |
| 11,531,520 B2 | 11/2022 | Wilberding |
| 2002/0054685 A1 | 5/2002 | Avendano et al. |
| 2002/0055950 A1 | 5/2002 | Witteman |
| 2002/0143532 A1 | 10/2002 | McLean et al. |
| 2004/0093219 A1 | 5/2004 | Shin et al. |
| 2004/0153321 A1 | 8/2004 | Chung et al. |

(56) References Cited

U.S. PATENT DOCUMENTS

| | | |
|---|---|---|
| 2004/0161082 A1 | 8/2004 | Brown et al. |
| 2007/0033043 A1 | 2/2007 | Hyakumoto |
| 2007/0038461 A1 | 2/2007 | Abbott et al. |
| 2007/0201639 A1 | 8/2007 | Park et al. |
| 2008/0008333 A1 | 1/2008 | Nishikawa et al. |
| 2008/0031466 A1 | 2/2008 | Buck et al. |
| 2008/0160977 A1 | 7/2008 | Ahmaniemi et al. |
| 2008/0192946 A1 | 8/2008 | Faller |
| 2008/0221897 A1 | 9/2008 | Cerra et al. |
| 2008/0291916 A1 | 11/2008 | Xiong et al. |
| 2009/0013255 A1 | 1/2009 | Yuschik et al. |
| 2009/0046866 A1 | 2/2009 | Feng et al. |
| 2009/0113053 A1 | 4/2009 | Van Wie et al. |
| 2009/0214048 A1 | 8/2009 | Stokes, III et al. |
| 2009/0299745 A1 | 12/2009 | Kennewick et al. |
| 2009/0323924 A1 | 12/2009 | Tashev et al. |
| 2010/0070276 A1 | 3/2010 | Wasserblat et al. |
| 2010/0179806 A1 | 7/2010 | Zhang et al. |
| 2010/0260348 A1 | 10/2010 | Bhow et al. |
| 2010/0278351 A1 | 11/2010 | Fozunbal et al. |
| 2010/0299639 A1 | 11/2010 | Ramsay et al. |
| 2010/0329472 A1 | 12/2010 | Nakadai et al. |
| 2010/0332236 A1 | 12/2010 | Tan |
| 2011/0019833 A1 | 1/2011 | Kuech et al. |
| 2011/0176687 A1 | 7/2011 | Birkenes |
| 2011/0267985 A1 | 11/2011 | Wilkinson et al. |
| 2012/0009906 A1 | 1/2012 | Patterson et al. |
| 2012/0020485 A1 | 1/2012 | Visser et al. |
| 2012/0027218 A1 | 2/2012 | Every et al. |
| 2012/0076308 A1 | 3/2012 | Kuech et al. |
| 2012/0078635 A1 | 3/2012 | Rothkopf et al. |
| 2012/0224457 A1 | 9/2012 | Kim et al. |
| 2012/0237047 A1 | 9/2012 | Neal et al. |
| 2012/0245941 A1 | 9/2012 | Cheyer |
| 2012/0265528 A1 | 10/2012 | Gruber et al. |
| 2012/0288100 A1 | 11/2012 | Cho |
| 2013/0073293 A1 | 3/2013 | Jang et al. |
| 2013/0080146 A1 | 3/2013 | Kato et al. |
| 2013/0080167 A1 | 3/2013 | Mozer |
| 2013/0080171 A1 | 3/2013 | Mozer et al. |
| 2013/0129100 A1 | 5/2013 | Sorensen |
| 2013/0185639 A1 | 7/2013 | Lim |
| 2013/0230184 A1 | 9/2013 | Kuech et al. |
| 2013/0238326 A1 | 9/2013 | Kim et al. |
| 2013/0283169 A1 | 10/2013 | Van Wie |
| 2013/0289994 A1 | 10/2013 | Newman et al. |
| 2013/0294611 A1 | 11/2013 | Yoo et al. |
| 2013/0301840 A1 | 11/2013 | Yemdji et al. |
| 2013/0322634 A1 | 12/2013 | Bennett et al. |
| 2013/0336499 A1 | 12/2013 | Beckhardt et al. |
| 2013/0339028 A1 | 12/2013 | Rosner et al. |
| 2014/0006825 A1 | 1/2014 | Shenhav |
| 2014/0056435 A1 | 2/2014 | Nems et al. |
| 2014/0064476 A1 | 3/2014 | Mani et al. |
| 2014/0108010 A1 | 4/2014 | Maltseff et al. |
| 2014/0126745 A1 | 5/2014 | Dickins et al. |
| 2014/0159581 A1 | 6/2014 | Pruemmer et al. |
| 2014/0161263 A1 | 6/2014 | Koishida et al. |
| 2014/0172899 A1 | 6/2014 | Hakkani-Tur et al. |
| 2014/0181199 A1 | 6/2014 | Kumar et al. |
| 2014/0188476 A1 | 7/2014 | Li et al. |
| 2014/0200881 A1 | 7/2014 | Chatlani |
| 2014/0214429 A1 | 7/2014 | Pantel |
| 2014/0229959 A1 | 8/2014 | Beckhardt et al. |
| 2014/0244269 A1 | 8/2014 | Tokutake |
| 2014/0270216 A1 | 9/2014 | Tsilfidis et al. |
| 2014/0274203 A1 | 9/2014 | Ganong, III et al. |
| 2014/0278343 A1 | 9/2014 | Tran |
| 2014/0278445 A1 | 9/2014 | Eddington, Jr. |
| 2014/0288686 A1 | 9/2014 | Sant et al. |
| 2014/0328490 A1 | 11/2014 | Mohammad et al. |
| 2014/0363022 A1 | 12/2014 | Dizon et al. |
| 2014/0364089 A1 | 12/2014 | Lienhart et al. |
| 2014/0365225 A1 | 12/2014 | Haiut |
| 2014/0368734 A1 | 12/2014 | Hoffert et al. |
| 2015/0030172 A1 | 1/2015 | Gaensler et al. |
| 2015/0032443 A1 | 1/2015 | Karov et al. |
| 2015/0032456 A1 | 1/2015 | Wait |
| 2015/0039310 A1 | 2/2015 | Clark et al. |
| 2015/0039311 A1 | 2/2015 | Clark et al. |
| 2015/0073807 A1 | 3/2015 | Kumar |
| 2015/0088500 A1 | 3/2015 | Conliffe |
| 2015/0126255 A1 | 5/2015 | Yang et al. |
| 2015/0154953 A1 | 6/2015 | Bapat et al. |
| 2015/0221307 A1 | 8/2015 | Shah et al. |
| 2015/0373100 A1 | 12/2015 | Kravets et al. |
| 2015/0380010 A1* | 12/2015 | Srinivasan .............. H04R 1/025 704/227 |
| 2015/0382128 A1 | 12/2015 | Ridihalgh et al. |
| 2016/0027440 A1 | 1/2016 | Gelfenbeyn et al. |
| 2016/0034448 A1 | 2/2016 | Tran |
| 2016/0055847 A1 | 2/2016 | Dahan |
| 2016/0066087 A1 | 3/2016 | Solbach et al. |
| 2016/0077794 A1 | 3/2016 | Kim et al. |
| 2016/0093281 A1 | 3/2016 | Kuo et al. |
| 2016/0134924 A1 | 5/2016 | Bush et al. |
| 2016/0148612 A1 | 5/2016 | Guo et al. |
| 2016/0171976 A1 | 6/2016 | Sun et al. |
| 2016/0212488 A1 | 7/2016 | Os et al. |
| 2016/0299737 A1 | 10/2016 | Clayton et al. |
| 2016/0322045 A1 | 11/2016 | Hatfield et al. |
| 2016/0379634 A1 | 12/2016 | Yamamoto et al. |
| 2016/0379635 A1 | 12/2016 | Page |
| 2017/0083606 A1 | 3/2017 | Mohan |
| 2017/0084278 A1 | 3/2017 | Jung |
| 2017/0110130 A1 | 4/2017 | Sharifi et al. |
| 2017/0140750 A1 | 5/2017 | Wang et al. |
| 2017/0140757 A1 | 5/2017 | Penilla et al. |
| 2017/0140759 A1 | 5/2017 | Kumar et al. |
| 2017/0164139 A1 | 6/2017 | Deselaers et al. |
| 2017/0186425 A1 | 6/2017 | Dawes et al. |
| 2017/0186427 A1 | 6/2017 | Wang et al. |
| 2017/0242653 A1 | 8/2017 | Lang et al. |
| 2017/0242656 A1 | 8/2017 | Plagge et al. |
| 2017/0243587 A1 | 8/2017 | Plagge et al. |
| 2017/0245076 A1 | 8/2017 | Kusano et al. |
| 2017/0269900 A1 | 9/2017 | Triplett |
| 2017/0270919 A1 | 9/2017 | Parthasarathi et al. |
| 2017/0300289 A1 | 10/2017 | Gattis |
| 2017/0329397 A1 | 11/2017 | Lin |
| 2017/0357390 A1 | 12/2017 | Alonso Ruiz et al. |
| 2017/0364371 A1 | 12/2017 | Nandi et al. |
| 2017/0365247 A1 | 12/2017 | Ushakov |
| 2018/0012077 A1 | 1/2018 | Laska et al. |
| 2018/0033429 A1 | 2/2018 | Makke et al. |
| 2018/0040324 A1 | 2/2018 | Wilberding |
| 2018/0061396 A1 | 3/2018 | Srinivasan et al. |
| 2018/0061409 A1 | 3/2018 | Valentine et al. |
| 2018/0091913 A1 | 3/2018 | Hartung et al. |
| 2018/0096678 A1 | 4/2018 | Zhou et al. |
| 2018/0137857 A1 | 5/2018 | Zhou et al. |
| 2018/0139512 A1 | 5/2018 | Moran et al. |
| 2018/0182410 A1 | 6/2018 | Kaskari et al. |
| 2018/0196776 A1 | 7/2018 | Hershko et al. |
| 2018/0199130 A1 | 7/2018 | Jaffe et al. |
| 2018/0233141 A1 | 8/2018 | Solomon et al. |
| 2018/0260680 A1 | 9/2018 | Finkelstein et al. |
| 2018/0270573 A1 | 9/2018 | Lang et al. |
| 2018/0277113 A1 | 9/2018 | Hartung et al. |
| 2018/0293221 A1 | 10/2018 | Finkelstein et al. |
| 2018/0301147 A1 | 10/2018 | Kim |
| 2018/0330727 A1 | 11/2018 | Tulli |
| 2018/0336892 A1 | 11/2018 | Kim et al. |
| 2018/0350356 A1 | 12/2018 | Garcia |
| 2018/0350379 A1 | 12/2018 | Wung et al. |
| 2018/0352014 A1 | 12/2018 | Alsina et al. |
| 2018/0352334 A1 | 12/2018 | Family et al. |
| 2018/0358019 A1 | 12/2018 | Mont-Reynaud |
| 2019/0019112 A1 | 1/2019 | Gelfenbeyn et al. |
| 2019/0035404 A1 | 1/2019 | Gabel et al. |
| 2019/0037173 A1 | 1/2019 | Lee |
| 2019/0044745 A1 | 2/2019 | Knudson et al. |
| 2019/0066680 A1 | 2/2019 | Woo et al. |
| 2019/0066710 A1 | 2/2019 | Bryan et al. |

(56) References Cited

U.S. PATENT DOCUMENTS

| | | |
|---|---|---|
| 2019/0073999 A1 | 3/2019 | Prémont et al. |
| 2019/0108839 A1 | 4/2019 | Reilly et al. |
| 2019/0122662 A1 | 4/2019 | Chang et al. |
| 2019/0130906 A1 | 5/2019 | Kobayashi et al. |
| 2019/0156847 A1 | 5/2019 | Bryan et al. |
| 2019/0172452 A1 | 6/2019 | Smith et al. |
| 2019/0172467 A1 | 6/2019 | Kim et al. |
| 2019/0172476 A1 | 6/2019 | Wung et al. |
| 2019/0186937 A1 | 6/2019 | Sharifi et al. |
| 2019/0188328 A1 | 6/2019 | Oyenan et al. |
| 2019/0189117 A1 | 6/2019 | Kumar |
| 2019/0206405 A1 | 7/2019 | Gillespie et al. |
| 2019/0206412 A1 | 7/2019 | Li et al. |
| 2019/0237089 A1 | 8/2019 | Shin |
| 2019/0251960 A1 | 8/2019 | Maker et al. |
| 2019/0259408 A1 | 8/2019 | Freeman et al. |
| 2019/0281387 A1 | 9/2019 | Woo et al. |
| 2019/0287536 A1 | 9/2019 | Sharifi et al. |
| 2019/0295555 A1 | 9/2019 | Wilberding |
| 2019/0295556 A1 | 9/2019 | Wilberding |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0371324 A1 | 12/2019 | Powell et al. |
| 2019/0371342 A1 | 12/2019 | Tukka et al. |
| 2019/0392832 A1 | 12/2019 | Mitsui et al. |
| 2020/0043489 A1 | 2/2020 | Bradley et al. |
| 2020/0110571 A1 | 4/2020 | Liu et al. |
| 2020/0125162 A1 | 4/2020 | D'Amato et al. |
| 2020/0135194 A1 | 4/2020 | Jeong |
| 2020/0135224 A1 | 4/2020 | Bromand et al. |
| 2020/0184980 A1 | 6/2020 | Wilberding |
| 2020/0244650 A1 | 7/2020 | Burris et al. |
| 2020/0342869 A1 | 10/2020 | Lee et al. |
| 2020/0409926 A1 | 12/2020 | Srinivasan et al. |
| 2021/0118439 A1 | 4/2021 | Schillmoeller et al. |
| 2021/0295849 A1 | 9/2021 | Van Der Ven et al. |
| 2021/0358481 A1 | 11/2021 | D'Amato et al. |
| 2022/0036882 A1 | 2/2022 | Ahn et al. |
| 2022/0050585 A1 | 2/2022 | Fettes et al. |
| 2022/0083136 A1 | 3/2022 | DeLeeuw |
| 2022/0301561 A1 | 9/2022 | Robert Jose et al. |

FOREIGN PATENT DOCUMENTS

| | | |
|---|---|---|
| CN | 101427154 A | 5/2009 |
| CN | 102999161 A | 3/2013 |
| CN | 104572009 A | 4/2015 |
| CN | 104885406 A | 9/2015 |
| CN | 104885438 A | 9/2015 |
| CN | 105162886 A | 12/2015 |
| CN | 105284168 A | 1/2016 |
| CN | 105389099 A | 3/2016 |
| CN | 105427861 A | 3/2016 |
| CN | 105453179 A | 3/2016 |
| CN | 105472191 A | 4/2016 |
| CN | 105493179 A | 4/2016 |
| CN | 105632486 A | 6/2016 |
| CN | 106030699 A | 10/2016 |
| CN | 106796784 A | 5/2017 |
| CN | 106910500 A | 6/2017 |
| CN | 107122158 A | 9/2017 |
| CN | 107465974 A | 12/2017 |
| CN | 107644313 A | 1/2018 |
| CN | 107767863 A | 3/2018 |
| CN | 107832837 A | 3/2018 |
| CN | 107919116 A | 4/2018 |
| CN | 108028047 A | 5/2018 |
| CN | 108028048 A | 5/2018 |
| CN | 108198548 A | 6/2018 |
| GB | 2501367 A | 10/2013 |
| JP | 2004109361 A | 4/2004 |
| JP | 2004163590 A | 6/2004 |
| JP | 2007235875 A | 9/2007 |
| JP | 2008217444 A | 9/2008 |
| JP | 2014510481 A | 4/2014 |
| JP | 2016009193 A | 1/2016 |
| JP | 2019109510 A | 7/2019 |
| TW | 201629950 A | 8/2016 |
| WO | 2008096414 A1 | 8/2008 |
| WO | 2015133022 A1 | 9/2015 |
| WO | 2015195216 A1 | 12/2015 |
| WO | 2016003509 A1 | 1/2016 |
| WO | 2016014686 A1 | 1/2016 |
| WO | 2016136062 A1 | 9/2016 |
| WO | 2018140777 A1 | 8/2018 |
| WO | 2019005772 A1 | 1/2019 |

OTHER PUBLICATIONS

Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2023, issued in connection with U.S. Appl. No. 17/562,412, filed Dec. 27, 2021, 9 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Sep. 21, 2022, issued in connection with U.S. Appl. No. 17/128,949, filed Dec. 21, 2020, 8 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Feb. 23, 2023, issued in connection with U.S. Appl. No. 17/532,674, filed Nov. 22, 2021, 10 pages.
Notice of Allowance mailed on Mar. 24, 2022, issued in connection with U.S. Appl. No. 16/378,516, filed Apr. 8, 2019, 7 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2022, issued in connection with U.S. Appl. No. 17/145,667, filed Jan. 11, 2021, 8 pages.
Notice of Allowance mailed on Oct. 26, 2022, issued in connection with U.S. Appl. No. 17/486,574, filed Sep. 27, 2021, 11 pages.
Notice of Allowance mailed on Jun. 27, 2022, issued in connection with U.S. Appl. No. 16/812,758, filed Mar. 9, 2020, 16 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2022, issued in connection with U.S. Appl. No. 17/327,911, filed May 24, 2021, 14 pages.
Notice of Allowance mailed on Jul. 29, 2022, issued in connection with U.S. Appl. No. 17/236,559, filed Apr. 21, 2021, 6 pages.
Notice of Allowance mailed on Mar. 29, 2023, issued in connection with U.S. Appl. No. 17/722,438, filed Apr. 18, 2022, 7 pages.
Notice of Allowance mailed on Mar. 3, 2022, issued in connection with U.S. Appl. No. 16/679,538, filed Nov. 11, 2019, 7 pages.
Notice of Allowance mailed on Jun. 30, 2023, issued in connection with U.S. Appl. No. 17/303,001, filed May 18, 2021, 8 pages.
Notice of Allowance mailed on Mar. 30, 2023, issued in connection with U.S. Appl. No. 17/303,066, filed May 19, 2021, 7 pages.
Notice of Allowance mailed on Mar. 31, 2023, issued in connection with U.S. Appl. No. 17/303,735, filed Jun. 7, 2021, 19 pages.
Notice of Allowance mailed on Apr. 5, 2023, issued in connection with U.S. Appl. No. 17/549,253, filed Dec. 13, 2021, 10 pages.
Notice of Allowance mailed on Mar. 6, 2023, issued in connection with U.S. Appl. No. 17/449,926, filed Oct. 4, 2021, 8 pages.

(56) References Cited

OTHER PUBLICATIONS

Notice of Allowance mailed on Apr. 8, 2022, issued in connection with U.S. Appl. No. 16/813,643, filed Mar. 9, 2020, 7 pages.
Simon Doclo et al. Combined Acoustic Echo and Noise Reduction Using Gsvd-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. INTERSPEECH, TALP Research Center, Jan. 2010, 5 pages.
Wölfel et al. Multi-source far-distance microphone selection and combination for automatic transcription of lectures, INTERSPEECH 2006—ICSLP, Jan. 2006, 5 pages.
Zhang et al. Noise Robust Speech Recognition Using Multi-Channel Based Channel Selection And Channel Weighting. The Institute of Electronics, Information and Communication Engineers, arXiv:1604.03276v1 [cs.SD] Jan. 1, 2010, 8 pages.
Advisory Action mailed on Nov. 7, 2022, issued in connection with U.S. Appl. No. 16/168,389, filed Oct. 23, 2018, 4 pages.
Advisory Action mailed on Feb. 28, 2022, issued in connection with U.S. Appl. No. 16/813,643, filed Mar. 9, 2020, 3 pages.
Australian Patent Office, Australian Examination Report Action mailed on Nov. 10, 2022, issued in connection with Australian Application No. 2018312989, 2 pages.
Australian Patent Office, Australian Examination Report Action mailed on Jul. 11, 2023, issued in connection with Australian Application No. 2022246446, 2 pages.
Australian Patent Office, Australian Examination Report Action mailed on Jun. 14, 2023, issued in connection with Australian Application No. 2019299865, 2 pages.
Australian Patent Office, Australian Examination Report Action mailed on May 19, 2022, issued in connection with Australian Application No. 2021212112, 2 pages.
Australian Patent Office, Australian Examination Report Action mailed on Sep. 28, 2022, issued in connection with Australian Application No. 2018338812, 3 pages.
Australian Patent Office, Australian Examination Report Action mailed on Mar. 4, 2022, issued in connection with Australian Application No. 2021202786, 2 pages.
Canadian Patent Office, Canadian Examination Report mailed on Sep. 14, 2022, issued in connection with Canadian Application No. 3067776, 4 pages.
Canadian Patent Office, Canadian Examination Report mailed on Oct. 19, 2022, issued in connection with Canadian Application No. 3123601, 5 pages.
Canadian Patent Office, Canadian Examination Report mailed on Mar. 29, 2022, issued in connection with Canadian Application No. 3111322, 3 pages.
Canadian Patent Office, Canadian Examination Report mailed on Jun. 7, 2022, issued in connection with Canadian Application No. 3105494, 5 pages.
Chinese Patent Office, First Office Action and Translation mailed on Jun. 1, 2021, issued in connection with Chinese Application No. 201980089721.5, 21 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916.X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Dec. 30, 2022, issued in connection with Chinese Application No. 201880076775.3, 10 pages.
Chinese Patent Office, Second Office Action and Translation mailed on Mar. 3, 2022, issued in connection with Chinese Application No. 201880077216.4, 11 pages.
Chinese Patent Office, Second Office Action and Translation mailed on Apr. 1, 2023, issued in connection with Chinese Application No. 201980056604.9, 11 pages.
Chinese Patent Office, Second Office Action mailed on Dec. 21, 2022, issued in connection with Chinese Application No. 201980089721.5, 12 pages.
Chinese Patent Office, Second Office Action mailed on May 30, 2023, issued in connection with Chinese Application No. 201980070006.7, 9 pages.
European Patent Office, Decision to Refuse European Patent Application mailed on May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.
European Patent Office, European EPC Article 94.3 mailed on Feb. 10, 2023, issued in connection with European Application No. 19729968.8, 7 pages.
European Patent Office, European EPC Article 94.3 mailed on Mar. 11, 2022, issued in connection with European Application No. 19731415.6, 7 pages.
European Patent Office, European EPC Article 94.3 mailed on May 2, 2022, issued in connection with European Application No. 20185599.6, 7 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2023, issued in connection with European Application No. 19839734.1, 8 pages.
European Patent Office, European EPC Article 94.3 mailed on Nov. 28, 2022, issued in connection with European Application No. 18789515.6, 7 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European Extended Search Report mailed on Oct. 7, 2022, issued in connection with European Application No. 22182193.7, 8 pages.
European Patent Office, European Extended Search Report mailed on Apr. 22, 2022, issued in connection with European Application No. 21195031.6, 14 pages.
European Patent Office, European Extended Search Report mailed on Jun. 23, 2022, issued in connection with European Application No. 22153180.9, 6 pages.
European Patent Office, European Extended Search Report mailed on Jun. 30, 2022, issued in connection with European Application No. 21212763.3, 9 pages.

(56) References Cited

OTHER PUBLICATIONS

European Patent Office, European Extended Search Report mailed on Jul. 8, 2022, issued in connection with European Application No. 22153523.0, 9 pages.
European Patent Office, European Search Report mailed on Mar. 1, 2022, issued in connection with European Application No. 21180778.9, 9 pages.
European Patent Office, European Search Report mailed on Oct. 4, 2022, issued in connection with European Application No. 22180226.7, 6 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Feb. 4, 2022, issued in connection with European Application No. 17757075.1, 10 pages.
Final Office Action mailed on Jun. 1, 2022, issued in connection with U.S. Appl. No. 16/806,747, filed Mar. 2, 2020, 20 pages.
Final Office Action mailed on Aug. 17, 2022, issued in connection with U.S. Appl. No. 16/179,779, filed Nov. 2, 2018, 26 pages.
Final Office Action mailed on May 17, 2023, issued in connection with U.S. Appl. No. 16/168,389, filed Oct. 23, 2018, 44 pages.
Final Office Action mailed on Mar. 21, 2022, issued in connection with U.S. Appl. No. 16/153,530, filed Oct. 5, 2018, 23 pages.
Final Office Action mailed on Aug. 22, 2022, issued in connection with U.S. Appl. No. 16/168,389, filed Oct. 23, 2018, 37 pages.
Final Office Action mailed on Jul. 27, 2022, issued in connection with U.S. Appl. No. 16/989,350, filed Aug. 10, 2020, 15 pages.
Non-Final Office Action mailed on May 25, 2023, issued in connection with U.S. Appl. No. 18/157,937, filed Jan. 23, 2023, 9 pages.
Non-Final Office Action mailed on Oct. 25, 2022, issued in connection with U.S. Appl. No. 17/549,034, filed Dec. 13, 2021, 20 pages.
Non-Final Office Action mailed on May 26, 2022, issued in connection with U.S. Appl. No. 16/989,805, filed Aug. 10, 2020, 14 pages.
Non-Final Office Action mailed on Feb. 27, 2023, issued in connection with U.S. Appl. No. 17/493,430, filed Oct. 4, 2021, 17 pages.
Non-Final Office Action mailed on Feb. 28, 2023, issued in connection with U.S. Appl. No. 17/548,921, filed Dec. 13, 2021, 12 pages.
Non-Final Office Action mailed on Mar. 28, 2022, issued in connection with U.S. Appl. No. 17/222,151, filed Apr. 5, 2021, 5 pages.
Non-Final Office Action mailed on Jul. 3, 2023, issued in connection with U.S. Appl. No. 17/135,173, filed Dec. 28, 2020, 22 pages.
Non-Final Office Action mailed on Sep. 30, 2022, issued in connection with U.S. Appl. No. 17/353,254, filed Jun. 21, 2021, 22 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Feb. 7, 2023, issued in connection with U.S. Appl. No. 17/303,001, filed May 18, 2021, 8 pages.
Non-Final Office Action mailed on Jun. 7, 2023, issued in connection with U.S. Appl. No. 16/179,779, filed Nov. 2, 2018, 29 pages.
Non-Final Office Action mailed on Mar. 7, 2022, issued in connection with U.S. Appl. No. 16/812,758, filed Mar. 9, 2020, 18 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Notice of Allowance mailed on Nov. 9, 2022, issued in connection with U.S. Appl. No. 17/385,542, filed Jul. 26, 2021, 8 pages.
Notice of Allowance mailed on Mar. 1, 2022, issued in connection with U.S. Appl. No. 16/879,549, filed May 20, 2020, 9 pages.
Notice of Allowance mailed on Jul. 10, 2023, issued in connection with U.S. Appl. No. 17/315,599, filed May 10, 2021, 2 pages.
Notice of Allowance mailed on Jun. 10, 2022, issued in connection with U.S. Appl. No. 16/879,549, filed May 20, 2020, 8 pages.
Notice of Allowance mailed on May 11, 2022, issued in connection with U.S. Appl. No. 17/135,123, filed Dec. 28, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Jul. 12, 2022, issued in connection with U.S. Appl. No. 16/907,953, filed Jun. 22, 2020, 8 pages.
Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2023, issued in connection with U.S. Appl. No. 17/453,632, filed Nov. 4, 2021, 9 pages.
Notice of Allowance mailed on Apr. 13, 2022, issued in connection with U.S. Appl. No. 17/236,559, filed Apr. 21, 2021, 7 pages.
Notice of Allowance mailed on Feb. 13, 2023, issued in connection with U.S. Appl. No. 18/045,360, filed Oct. 10, 2022, 9 pages.
Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Aug. 15, 2022, issued in connection with U.S. Appl. No. 17/101,949, filed Nov. 23, 2020, 11 pages.
Notice of Allowance mailed on Feb. 15, 2023, issued in connection with U.S. Appl. No. 17/659,613, filed Apr. 18, 2022, 21 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Sep. 15, 2022, issued in connection with U.S. Appl. No. 16/736,725, filed Jan. 1, 2020, 11 pages.
Notice of Allowance mailed on Aug. 17, 2022, issued in connection with U.S. Appl. No. 17/135,347, filed Dec. 28, 2020, 14 pages.
Notice of Allowance mailed on Nov. 17, 2022, issued in connection with U.S. Appl. No. 17/486,222, filed Sep. 27, 2021, 10 pages.
Final Office Action mailed on Mar. 29, 2023, issued in connection with U.S. Appl. No. 17/549,034, filed Dec. 13, 2021, 21 pages.
Final Office Action mailed on Jun. 7, 2022, issued in connection with U.S. Appl. No. 16/736,725, filed Jan. 7, 2020, 14 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.

(56) References Cited

OTHER PUBLICATIONS

International Bureau, International Preliminary Report on Patentability, mailed on Jul. 21, 2022, issued in connection with International Application No. PCT/US2021/070007, filed on Jan. 6, 2021, 8 pages.
International Bureau, International Preliminary Report on Patentability, mailed on Apr. 26, 2022, issued in connection with International Application No. PCT/US2020/056632, filed on Oct. 21, 2020, 7 pages.
International Bureau, International Search Report and Written Opinion mailed on Mar. 20, 2023, issued in connection with International Application No. PCT/US2022/045399, filed on Sep. 30, 2022, 25 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on Oct. 4, 2022, issued in connection with Japanese Patent Application No. 2021-535871, 6 pages.
Japanese Patent Office, Decision of Refusal and Translation mailed on May 23, 2023, issued in connection with Japanese Patent Application No. 2021-163622, 13 pages.
Japanese Patent Office, Decision of Refusal and Translation mailed on Jul. 26, 2022, issued in connection with Japanese Patent Application No. 2020-513852, 10 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Office Action and Translation mailed on Nov. 15, 2022, issued in connection with Japanese Patent Application No. 2021-146144, 9 pages.
Japanese Patent Office, Office Action mailed on Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Apr. 19, 2022, issued in connection with Korean Application No. 10-2021-7008937, 14 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Office Action and Translation mailed on Feb. 27, 2023, issued in connection with Korean Application No. 10-2022-7021879, 5 pages.
Mathias Wolfel. Channel Selection by Class Separability Measures for Automatic Transcriptions on Distant Microphones, INTERSPEECH 2007 10.21437/Interspeech.2007-255, 4 pages.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099&searchProductType=IEEE%20Journals%20Transactions.
Non-Final Office Action mailed on Feb. 2, 2023, issued in connection with U.S. Appl. No. 17/305,698, filed Jul. 13, 2021, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Feb. 11, 2022, issued in connection with U.S. Appl. No. 17/145,667, filed Jan. 11, 2021, 9 pages.
Non-Final Office Action mailed on Apr. 12, 2023, issued in connection with U.S. Appl. No. 17/878,649, filed Aug. 1, 2022, 16 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2022, issued in connection with U.S. Appl. No. 17/446,690, filed Sep. 1, 2021, 10 pages.
Non-Final Office Action mailed on Aug. 15, 2022, issued in connection with U.S. Appl. No. 17/448,015, filed Sep. 17, 2021, 12 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Jul. 18, 2023, issued in connection with U.S. Appl. No. 18/066,093, filed Dec. 14, 2022, 12 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 19, 2022, issued in connection with U.S. Appl. No. 17/385,542, filed Jul. 26, 2021, 9 pages.
Non-Final Office Action mailed on Apr. 20, 2023, issued in connection with U.S. Appl. No. 18/061,570, filed Dec. 5, 2022, 12 pages.
Non-Final Office Action mailed on Oct. 20, 2022, issued in connection with U.S. Appl. No. 17/532,674, filed Nov. 22, 2021, 52 pages.
Non-Final Office Action mailed on Dec. 22, 2022, issued in connection with U.S. Appl. No. 16/168,389, filed Oct. 23, 2018, 39 pages.
Non-Final Office Action mailed on Jun. 23, 2023, issued in connection with U.S. Appl. No. 18/048,945, filed Oct. 24, 2022, 10 pages.
Non-Final Office Action mailed on Mar. 23, 2022, issued in connection with U.S. Appl. No. 16/907,953, filed Jun. 22, 2020, 7 pages.
Non-Final Office Action mailed on Sep. 23, 2022, issued in connection with U.S. Appl. No. 16/153,530, filed Oct. 5, 2018, 25 pages.
Non-Final Office Action mailed on Apr. 24, 2023, issued in connection with U.S. Appl. No. 17/532,744, filed Nov. 22, 2021, 18 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.

(56) References Cited

OTHER PUBLICATIONS

Non-Final Office Action mailed on Apr. 25, 2023, issued in connection with U.S. Appl. No. 17/656,794, filed Mar. 28, 2022, 22 pages.

* cited by examiner

DYNAMIC PLAYER SELECTION FOR AUDIO SIGNAL PROCESSING

CROSS-REFERENCE TO RELATED APPLICATIONS

This application claims priority to, and is a continuation of, U.S. Non-Provisional patent application Ser. No. 17/486,222, filed on Sep. 27, 2021, and titled "Dynamic Player Selection for Audio Signal Processing," which is a continuation of U.S. Non-Provisional Patent Application Ser. No. 16/927,670, filed on Jul. 13, 2020, and titled "Dynamic Player Selection for Audio Signal Processing," which is a continuation of U.S. Non-Provisional patent application Ser. No. 16/444,975, filed on Jun. 18, 2019, and titled "Dynamic Player Selection for Audio Signal Processing," which is a continuation of U.S. Non-Provisional patent application Ser. No. 15/959,907, filed on Apr. 23, 2018, and titled "Dynamic Player Selection for Audio Signal Processing," which is a continuation of U.S. Non-Provisional patent application Ser. No. 15/178,180, filed on Jun. 9, 2016, and titled "Dynamic Player Selection for Audio Signal Processing," the contents of each of which is incorporated herein in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play audio in any room that has a networked playback device. Additionally, using the control device, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
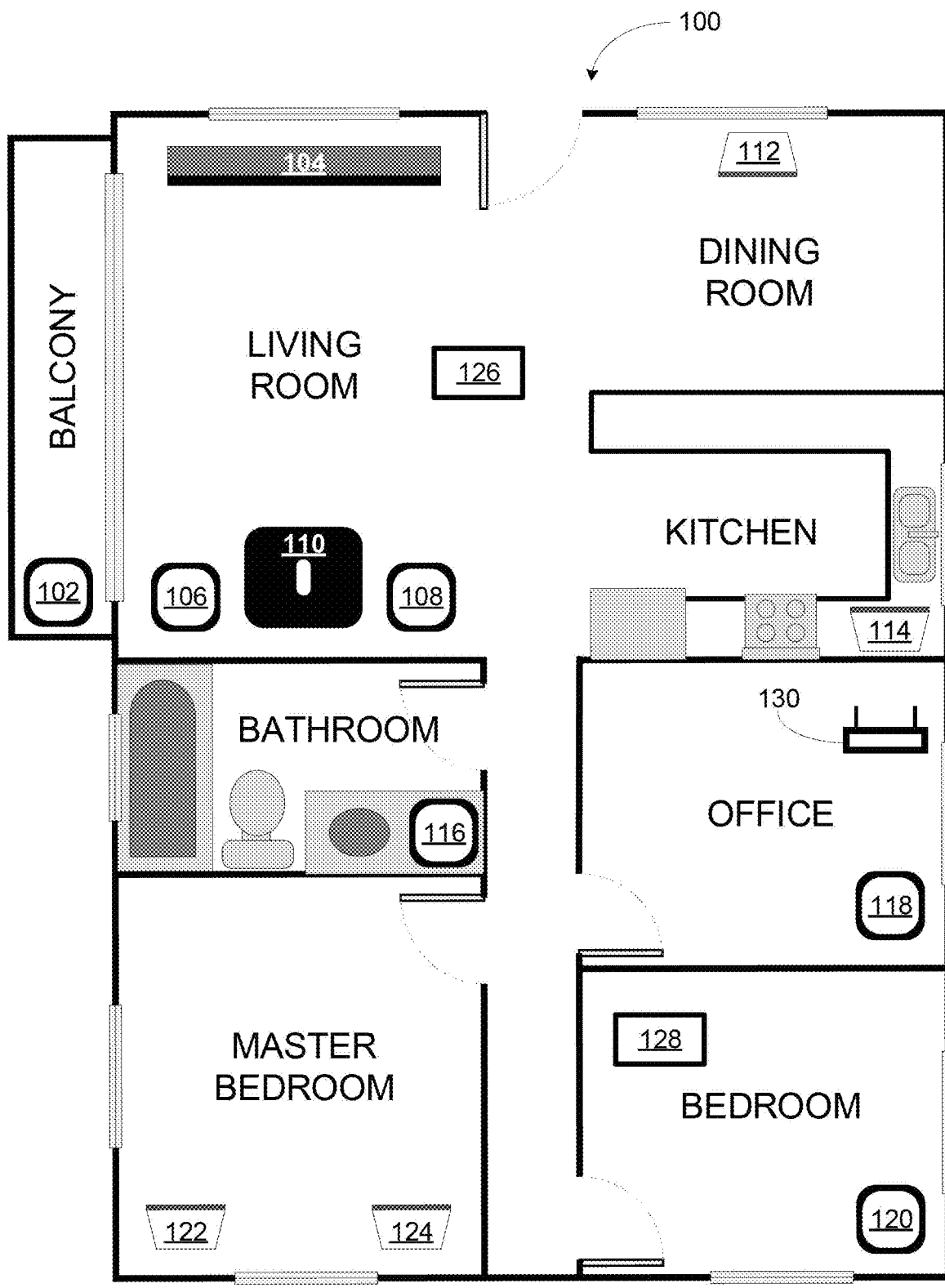
FIG. 1 shows an example playback system configuration in which certain embodiments may be practiced.

The drawings are for the purpose of illustrating example embodiments, but it is understood that the embodiments are not limited to the arrangements and instrumentality shown in the drawings.

DETAILED DESCRIPTION

I. Overview

A media playback system may include one or more playback devices, network microphone devices, controller devices, and/or computing devices. The playback device, network microphone device, controller device, and computing device may collectively coordinate play back of audio content such as music tracks.

The playback device, the controller device, and the network microphone device may be in an environment such as a living room in a home. A microphone array of one or more of these devices may receive an audio signal. The audio signal may include a sonic input and noise. The sonic input may be a voice input such as a request to perform an action associated with the media playback system, e.g., "play audio" or "stop playing audio". The sonic input may take the form of any other voice input as well. The noise may be any type of audio other than the sonic input. For example, the noise could include white noise or impulse noise. Alternatively, the "noise" could be audio content played by a playback device in the media playback system such as music.

It may be desirable to recover the sonic input from the audio signal. Embodiments described herein are directed to distributing, across devices in the media playback system, processing associated with improving a signal measure (e.g., signal to noise ratio) of the audio signal received by a device in the media playback system prior to the recovery of the sonic input. The processing is distributed to reduce degradation in performance of a particular device in the media playback system while the signal to noise ratio is improved. Improving the signal to noise ratio results in attenuating noise in the audio signal. The improved audio signal may then be passed to the computing device such as a server which is arranged to recover the sonic input. If the sonic input is a voice input, the server may interpret the voice input to determine the action associated with the voice input such as "play music on a playback device" or to "turn off the playback device". The server may then cause the media playback system to perform the action.

As one example, an echo cancellation method may be used to improve the signal to noise ratio of the audio signal received by a device in the media playback system. The echo cancellation method seeks to remove echoes in the received audio signal. As another example, a beamforming method may be used to improve the signal to noise ratio of the audio signal received by a device in the media playback system.

The beamforming method may determine characteristics of an audio signal received in certain direction such as whether the sonic input of the audio signal originates from the certain direction. In another example, one or more playback devices in the media playback system may be playing audio content in the background as the sonic input is received. The media playback system may have knowledge of this audio content, e.g., the spectral content of the audio content. The knowledge of the audio playing in the background may be used to improve the signal to noise ratio of the audio signal.

The methods described above are examples of various methods of improving the signal to noise ratio which can be applied separately or together to the audio signal to improve the signal to noise ratio. In this regard, a device may apply one or more of the algorithms described above, i.e., a first set of audio processing algorithms, to improve the signal to noise ratio of an audio signal that is received by the device. In embodiments, one or more of the received audio signal and the improved audio signal may also be stored on the playback device, controller device, or computing device as audio files.

In addition to improving the signal to noise ratio of the audio signal, a signal measure, such as the signal to noise ratio, for the audio signal as improved by one of the example algorithms described above may be calculated. The signal to noise ratio may be a ratio of the improved audio signal to the received audio signal. For example, the received audio signal and the improved audio signal may be represented as impulse responses. The impulse response of the improved audio signal may be divided by the received audio signal to calculate the signal to noise ratio.

A signal to noise ratio may be associated with each microphone array. For example, the echo cancellation algorithm provides an improved audio signal based on the audio signal received by the microphone array. The signal to noise ratio is based on this improved audio signal. Further, this signal to noise ratio may be also be associated with the device of the microphone array.

Alternatively, a plurality of signal to noise ratios may be associated with the microphone array. Each direction of a plurality of directions processed by a beamforming algorithm may have an associated signal to noise ratio. For example, the audio signal may be processed at directions of 20 degree angular intervals around the microphone array. Each 20 degree angular interval (18 intervals in total over 360 degrees) may have an associated impulse response of the received audio signal, impulse response of the improved audio signal, and signal to noise ratio.

The signal to noise ratios may be stored in a table. The table may also store an indication of the device/microphone array associated with a signal to noise ratio. In the case of beamforming, the table may also store an indication of a direction associated with the signal to noise ratio. The table may also be sorted such that the first entry in the table may identify the highest signal to noise ratio for the audio signal and the last entry may identify the lowest signal to noise ratio for the audio signal.

The respective processors of devices in the media playback system may have spare computational power. The spare computational power may be that computational power beyond what may be necessary to perform certain functions of the device. For example, the playback device may use computational power to play back audio but all the computational power may not be needed to play back the audio. The remaining computational power may be considered spare and could be used for further processing of the audio signal such as improving the signal to noise ratio of the audio signal received by a device.

Each device may indicate its spare computational power to a given device, such as a playback device, controller device, or server in the media playback system. For example, the spare computational power may be indicated by a state variable of the media playback system. This state variable may be periodically updated and made available to the devices in the media playback system. In some examples, the state variable may take the form of a flag which indicates that that playback device has a spare computational power. Further, various types of flags may be set depending on an amount of spare computational power available. Based on the state variable, the given device in the media playback system may obtain the spare computational power for each device and generate a table that identifies for each device its spare processing power. The spare computational power of each device in the media playback device may be organized in a table. Further, the table may be ordered based on availability of processing power. For example, the first entry in the table may be the device with a highest spare processing power and the last entry may identify the device with a lowest spare processing power. Other arrangements are also possible.

Then, processing tasks are assigned to the devices based on its spare computational power as defined by the table and computational power required by a processing task. The processing tasks may be defined by a second set of audio processing algorithms which includes the echo cancellation method, beamforming method, and/or subtraction of known signal method, among other. Each of these methods may have a higher resolution as compared to the first set of audio processing algorithms. The higher resolution processing may result in a further improvement of the signal to noise ratio of the audio signal as compared the first set of audio processing algorithms applied by the device when the audio signal was received.

The given device may assign impulse responses of one or more of the audio signals received by the device based on the spare computational power of a device and signal to noise ratios of the impulse responses. The impulse responses processed by each device based on the second set of audio processing algorithms result in an improved audio signal with a higher signal to noise ratio than what was previously determined with the first set of audio processing algorithms. Further, by using available spare computational power, performance of the media playback device is not degraded as a result of the additional processing.

The improved audio signal may also be weighted. The weighing may be based on a confidence level. The improved audio signals may then be combined. The combined signal may result in cancellation of any noise in the improved audio signal processed by the second set of audio processing algorithms. This combined audio signal may be then passed to a computing device such as a server for further processing.

Moving on from the above illustration, in one example embodiment, a network device may comprise a network interface; a processor comprising instructions, which when executed, cause the processor to: receive a set of signal measures, wherein each signal measure in the set of signal measures corresponds to a respective audio signal received by a device in a media playback system which is processed based on a first set of audio processing algorithms; identify a plurality of signal measures in the set of signal measures; cause, via the network interface, audio signals corresponding to the identified plurality of signal measures to be processed by one or more devices in the media playback system so as to improve a signal measure of each of the audio signals, wherein the audio signals are processed based on a second set of audio processing algorithms; and combine the processed audio signals into a combined audio signal. An algorithm of the second set of audio processing algorithms may process the audio signals based on content played by a playback device of the media playback system. Causing the audio signals corresponding to the identified plurality of signal measures to be processed by one or more devices in the media playback system may comprise receiving an indication of spare computational power from the one or more devices, identifying which devices have a spare computational power above a threshold amount, and causing the audio signals corresponding to the identified plurality of signal measures to be processed by the identified devices. A resolution of the first set of audio processing algorithms may be lower than a resolution of the second set of audio processing algorithms. The network device may further comprise instructions for causing the processor to send, via the network connection, the combined audio signal to a server. The first set of audio processing algorithms and the second set of audio processing algorithms may comprise one or more of an echo cancellation algorithm and a beamforming algorithm. Combining the processed audio signals into a combined audio signal may comprise weighting one or more of the processed audio signals. The audio signals may be impulse responses. A signal measure of the combined processed audio signals may be higher than any of the audio signals with improved signal measures. The identified plurality of signal measures in the set of signal measures may be those with signal to noise ratios above a threshold amount.

In another example embodiment, a method may comprise: receiving a set of signal measures, wherein each signal measure in the set of signal measures corresponds to a respective audio signal received by a device in a media playback system which is processed based on a first set of audio processing algorithms; identifying a plurality of signal measures in the set of signal measures; causing audio signals corresponding to the identified plurality of signal measures to be processed by one or more devices in the media playback system to improve a signal measure of each of the audio signals, wherein the audio signals are processed based on a second set of audio processing algorithms; and combining the processed audio signals into a combined audio signal. Causing the audio signals corresponding to the identified plurality of signal measures to be processed by one or more devices in the media playback system may comprise receiving an indication of spare computational power from each device in the media playback system, identifying which devices have a spare computational power above a threshold amount, and causing the audio signals corresponding to the identified plurality of signal measures to be processed by the identified devices. Combining the audio signals with improved signal measures into a combined audio signal may comprise weighting one or more of the processed audio signals. The method may further comprise sending the combined audio signal to a server. The first set of audio processing algorithms and the second set of audio processing algorithms may comprise one or more of an echo cancellation algorithm and a beamforming algorithm. The identified plurality of signal measures in the set of signal measures may be those with signal to noise ratios above a threshold amount.

In yet another example embodiment, a computer readable storage medium may include instructions for execution by a processor, the instructions, when executed, cause the processor to implement a method comprising: receiving a set of signal measures, wherein each signal measure in the set of signal measures corresponds to a respective audio signal received by a device in a media playback system which is processed based on a first set of audio processing algorithms; identifying a plurality of signal measures in the set of signal measures; causing audio signals corresponding to the identified plurality of signal measures to be processed by one or more devices in the media playback system to improve a signal measure of each of the audio signals, wherein the audio signals are processed based on a second set of audio processing algorithms; and combining the processed audio signals into a combined audio signal. Causing the audio signals corresponding to the identified plurality of signal measures to be processed by one or more devices in the media playback system may comprise receiving an indication of spare computational power from the one or more devices, identifying which devices have a spare computational power above a threshold amount, and causing the audio signals corresponding to the identified plurality of signal measures to be processed by the identified devices. Combining the processed audio signals into a combined audio signal may comprise weighting one or more of the processed audio signals.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
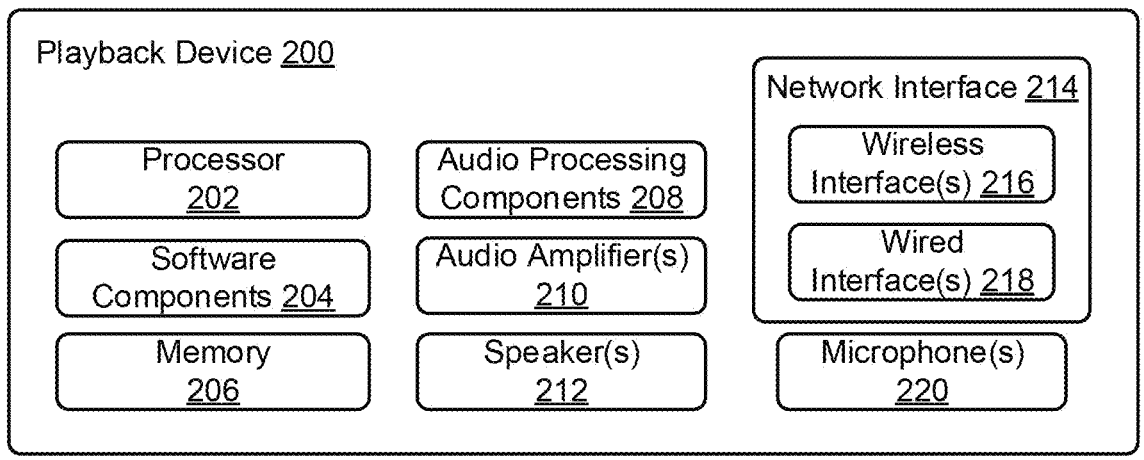
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s)

210, but rather an audio interface for connecting the playback device 200 to an external audio amplifier or audiovisual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
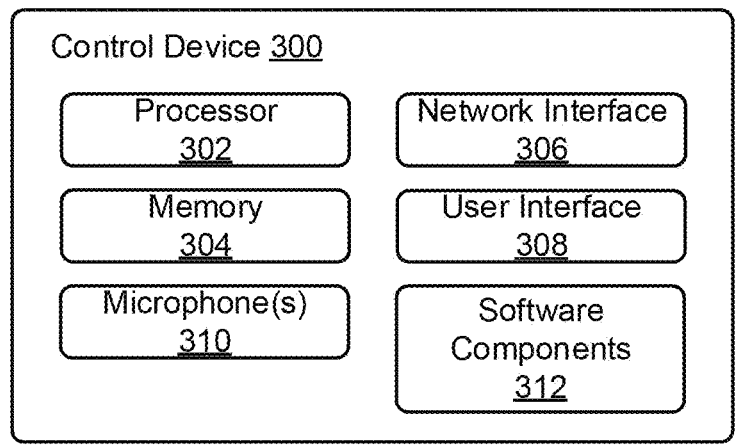
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
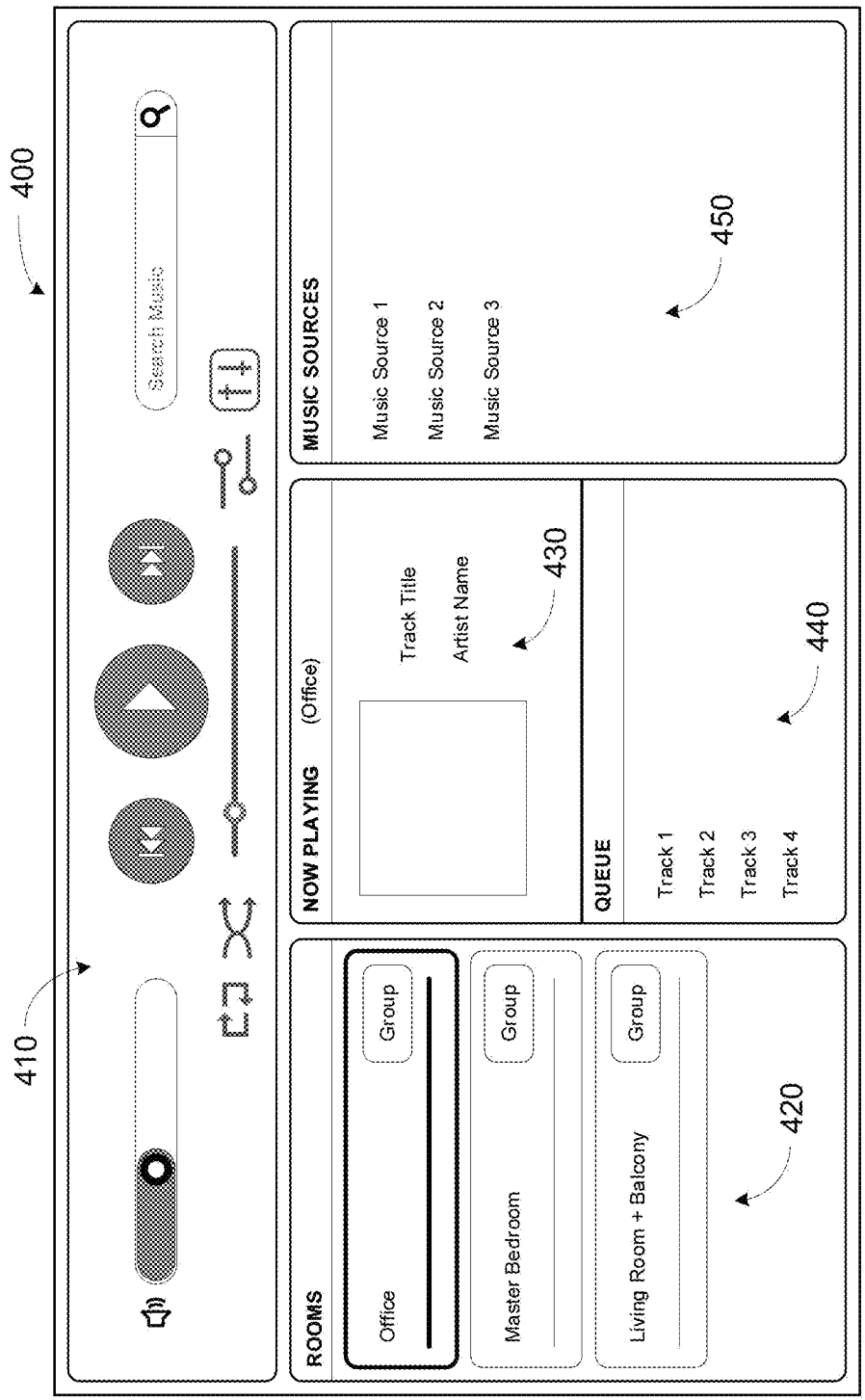
FIG. 4 shows an example control device interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use"

when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
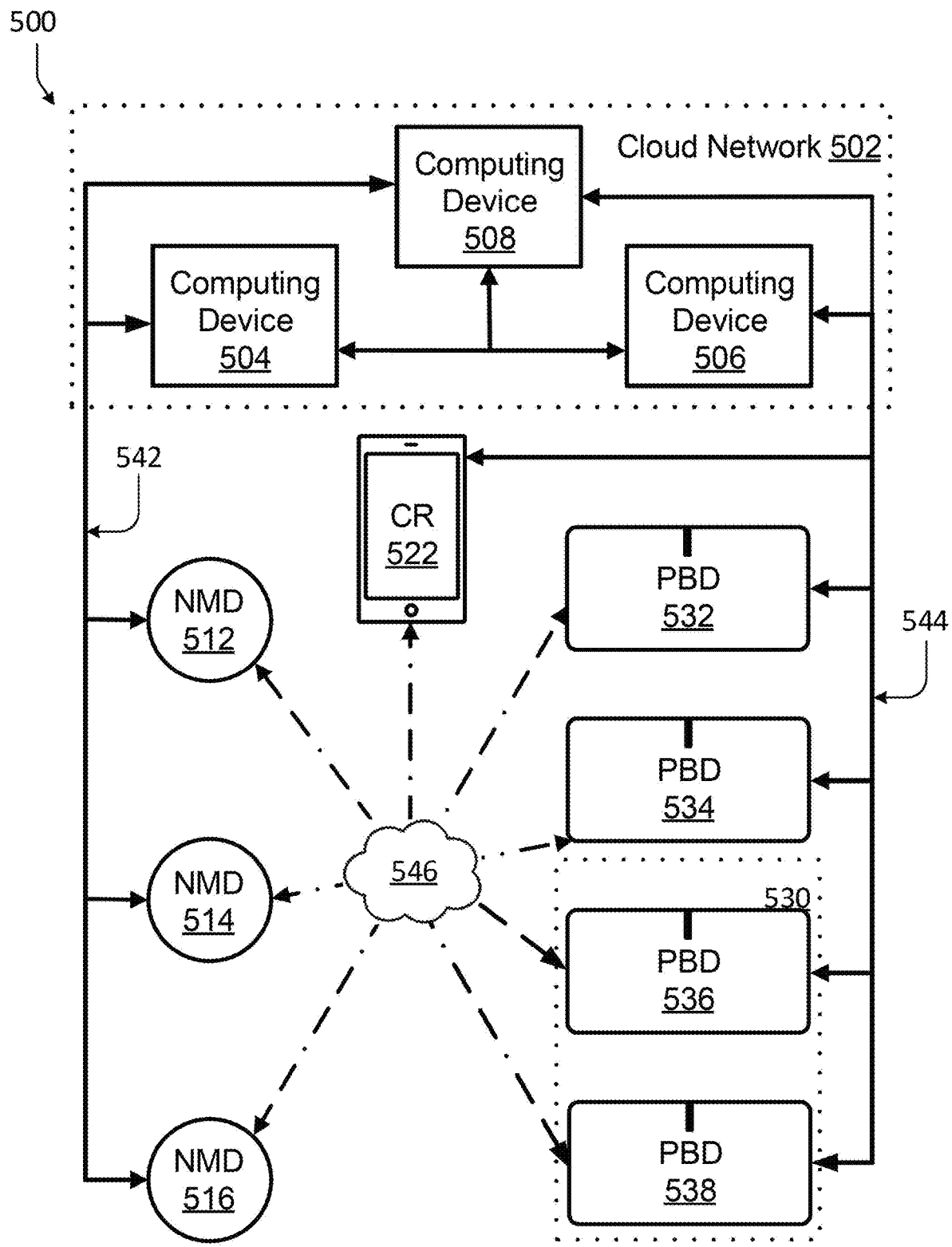
FIG. 5 shows an example network configuration in which certain embodiments may be practiced.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (N Ds) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
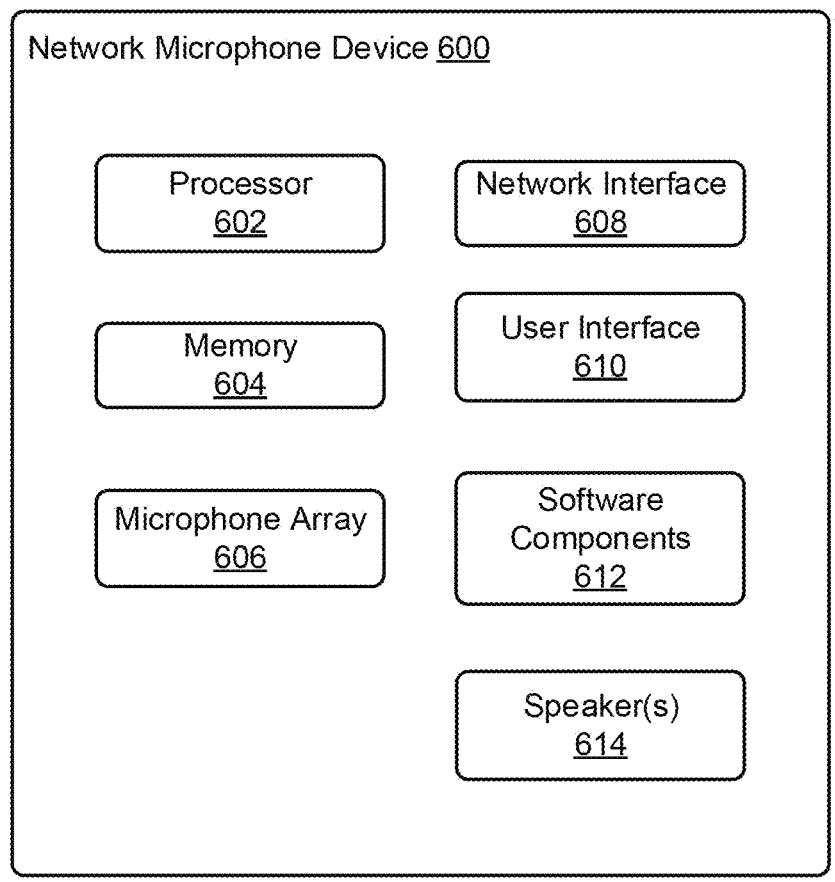
FIG. 6 shows a functional block diagram of an example network microphone device.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems

The playback device, the controller device, and the network microphone device may be in an environment such as a living room in a home. The microphone array of one or more of these devices may receive an audio signal. The audio signal may include an indication of a sonic input and noise. The sonic input may be a voice input such as a request to perform an action associated with the media playback system, e.g., "play audio" or "stop playing audio". The sonic input may take the form of any other voice input as well. The noise could include white noise or impulse noise. Alternatively, the "noise" could be audio content played by a playback device in the media playback system.

It may be desirable to recover the sonic input from the audio signal that is received via the microphone array of a device. Examples described herein are directed to distributing, across devices in the media playback system, processing associated with improving a signal measure (e.g., signal to noise ratio) of the audio signal received by a device in the media playback system prior to the recovery of the sonic input. The processing is distributed to reduce degradation in performance of a particular device in the media playback system while the signal to noise ratio is improved. Improving the signal to noise ratio results in attenuating noise in the audio signal. The improved audio signal may then be passed to a computing device such as a server which is arranged to recover the sonic input. If the sonic input is a voice input, the server may further interpret from voice input the action associated with the voice input such as "play music on a playback device" or to "turn off the playback device". The server may then cause the media playback system to perform the action.

Figure 7:
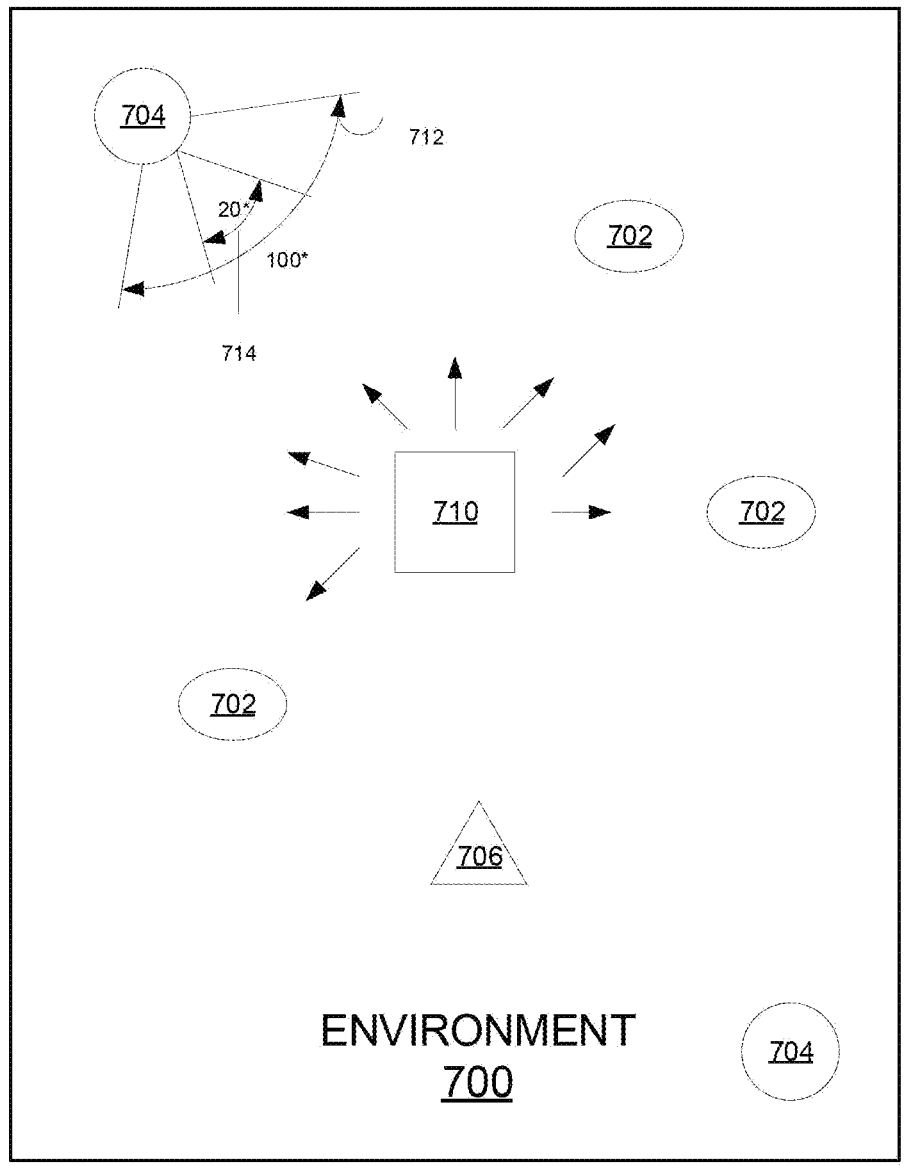
FIG. 7 shows an example environment in which certain embodiments may be practiced.

FIG. 7 illustrates an example environment 700 where audio signals may be present. The example environment may be a room of a home, such as a living room or bedroom, which has a media playback system for playing audio content. The media playback system may include one or more playback devices 702, network microphone devices 704, controller devices 706, and/or computing devices (not shown). The playback device 702 may have one or more microphones (e.g., microphone arrays) for receiving an audio signal, one or more speakers for playing back audio content, and a processor for playing back the audio content. The network microphone device 704 may have one or more microphones (e.g., microphone arrays) for receiving the audio signal and a processor for transmitting the received audio signal to the computing device. The controller device 706 may have one or more microphones (e.g., microphone arrays) for receiving an audio signal and a processor for controlling the one or more playback devices in the media playback system. The computing device may be a server which is arranged with a processor to perform various processing associated with the media playback system. The processing may include processing of the audio signal sent by the network microphone device 704. The computing device may be located remote to devices in the environment 700 such as in a cloud network. The computing device may also source audio content to the one or more playback devices for playback.

The example environment 700 may also have an audio source 710. The audio source 710 may provide a sonic input. For example, the audio source 710 may be a user of the media playback system who speaks in the environment. In this case, the audio source may be a voice input. The sonic input produced by the audio source 710 may be directed in one or more directions. In one example, the sonic input may be generally directed toward a device in the media playback system. In another example, sonic input may be directed away from the device in the media playback system. In yet another example, the sonic input may be directed uniformly in all directions throughout the environment. In this regard, one or more of the microphone arrays of the playback device 702, NMD 704, and/or controller device 706 may receive an audio signal that includes an indication of the sonic input.

The audio signal received by the microphone array may also receive any noise present in the environment. The noise may be audio that is received by the device aside from the sonic input. For example, the noise may include an attenuated version of the sonic input, and echoes of the sonic input, as a result of the sonic input traveling through the environment, bouncing off walls and objects in the environment before reaching a microphone array. The "noise" could also be any audio content being played back by a playback device such as music.

A signal to noise ratio is a signal measure indicative of a comparison of a desired signal in the audio signal to the noise in the audio signal. The desired signal may be the sonic input in the audio signal and the noise may be audio other than the sonic input in the audio signal. The audio signal may have a relatively high signal to noise ratio if the device which receives the audio signal is in a same direction as the sonic input. For example, the NMD 704 in the upper left corner of the environment 700 may receive an audio signal with a high signal to noise ratio because the audio source 710 is outputting a sonic input in the direction of the NMD 704. On the other hand, the audio signal may have a relatively low signal to noise ratio if the device which receives the audio signal is not in a same direction as the audio source 710. For example, the NMD 704 in the lower right corner of the environment 700 may receive an audio signal with a low signal to noise ratio because the audio source 710 is not outputting a sonic input in the direction of the NMD 704. The microphone array of the NMD 704 may still receive the sonic input, but indirectly, for example, as a result of the sonic input bouncing off walls of the environment, objects in the environment such as furniture, or the ceiling in the environment and reaching the microphone array.

In one example, the signal to noise ratio can be improved using echo cancellation. The microphone array may receive multiple versions of the audio signal having different phases and magnitudes depending on the path that the audio signal took to reach the microphone array. For example, the audio signal may bounce off objects in an environment, such as furniture, walls, and the ceiling, before being received by the microphone array. The microphone array may receive multiple versions of the audio signal, i.e., echoes, and the multiple versions may arrive at the microphone array at different times depending on how long the audio signal takes to travel from the source to the microphone array.

Echo cancellation seeks to remove such "echoes" in the received audio signal. The audio signal that is received by the microphone array may be represented as a plurality of impulse responses. Each impulse response may be associated with a microphone of the microphone array. The impulse responses may be time aligned based on a distance between microphones associated with a respective impulse response and combined into a single signal, e.g., a combined impulse response. Then, the combined impulse response may be divided into windows of time. For example, an impulse response of 1000 ms may be divided into overlapping and/or non-overlapping windows of impulse responses of 100 ms for processing. The size of the windows of time may determine the improvement of the signal to noise ratio, e.g., a larger window results in a better signal to noise ratio. The echoes may be removed in each window of time through an adaptive filtering process. Further, the combined impulse responses could be compared to echo characteristics of various sonic inputs. For example, the computing device may have a database of echo characteristics for the various sonic inputs. These echo characteristics may have been determined during a calibration process of the microphone array and/or stored in a database on the computing device. The comparison may result in determining a likelihood that a signal in the combined impulse response is a sonic input. The likelihood determination facilitates isolating the sonic input from echoes in the audio signal to improve the signal to noise ratio of the audio signal.

As another example, the signal to noise ratio can be improved using beamforming. In a polar domain, the audio signal may be present in a range of 0 to 360 degrees around the microphone array, albeit at different magnitudes and phases depending on how the sonic input travels from the audio source 710 to a microphone array. The microphone array may be arranged to capture the audio signals in an angular range of the 360 degrees. For example, NMD 704 in the upper left corner of the environment 700 is shown at 712 to capture audio in a 100 degree angular range. The audio signal received over a certain angular range, may be divided into angular intervals 714. For example, in the polar domain, the audio signal may be received at over a 100 degree angular range which is divided into five 20 degree angular intervals. Applying beamforming over a larger angular range and/or a smaller angular interval may result in an improved signal to noise ratio.

The audio signal received in an angular interval may have certain characteristics. The characteristics of the audio signal may be compared to known characteristics when a sonic input originates in that direction. These known characteristics may have been determined during a calibration process of the microphone array and/or stored in a database on the computing device. For example, an impulse response of the audio signal may be compared to a known impulse response when sonic input originated from a particular direction. This comparison may provide a likelihood that the sonic input of the audio signal originates in that particular direction. The direction of the sonic input may then be used by the beamforming algorithm to improve the signal to noise ratio of the audio signal.

If a playback device in the media playback system is playing audio at the same time that the microphone array receives the audio signal, then yet another algorithm (herein referred to as "subtraction of known signal method" and variants) may be used to improve the signal to noise ratio of the audio signal. The audio playing in the background is known to the media playback system. It may be stored in an audio file or streaming from a server. This known audio can be subtracted from the received audio signal to improve the signal to noise ratio of the audio signal. For example, the audio playing in the background and the audio signal may be represented as impulse responses of a certain duration. The impulse response of the audio playing in the background may be subtracted from the received audio signal so as to attenuate the audio that is being played from the audio signal and improve the signal to noise ratio of the audio signal.

The signal to noise ratio may be further improved based on one or more of a microphone response of the microphone array, a playback device response, and a room response. The microphone array may have a response indicative of its audio sensitivity versus frequency. The playback device may have a response indicative its audio output versus frequency. The room response may be indicative of acoustic characteristics of the room as described in U.S. patent application Ser. No. 14/481,511, entitled "Playback Device Calibration", the contents of which is herein incorporated by reference in its entirety. The microphone array response, the playback device response, and a room response may be used to improve the signal to noise ratio. For example, an inverse of the microphone array response, an inverse of the playback device response, and an inverse of the room response may be applied to the audio signal received by the microphone array prior to subtracting the impulse response of the audio being played back to improve the signal to noise ratio of the audio signal. The responses may also be used to improve the signal measures determined by the other algorithms as well.

The methods described above are examples of various methods of improving the signal to noise ratio. One or several algorithms may be applied or combined to improve the signal to noise ratio of the audio signal. An arrangement among a playback device playing audio, a microphone array, and an audio source may determine the type of audio improvement algorithm that is applied and the order in which it is applied. For example, if the playback device plays audio content and the audio source produces sonic input in a same direction toward the microphone array, then the subtraction of the known audio method may be applied to improve the signal to noise ratio. Beamforming may not be effective because the audio source and playback device are facing in the same direction and the beamforming would not be able to isolate the sonic input in view of the audio being played back by the playback device in the same direction. Then, echo cancelation method may be applied to cancel out any echoes associated with reverberation in the environment. As another example, the microphone array may be in between the playback device and the audio source.

If the audio source produces sonic input in a direction of the playback device and the playback device plays audio in the direction of the audio source, then the beamforming may be applied first if the microphone array is facing in the same direction as the audio source. Then, an echo cancellation may be used to cancel echoes. Other arrangements are also possible in accordance with the disclosed embodiments and the arrangement of the media playback system in the environment.

The audio signal, as processed by one or more signal to noise improvement methods may be referred to herein as an improved audio signal. In embodiments, the audio signal received by the microphone array and the improved audio signal may be stored on the playback device, controller device, or computing device as an audio file. The audio signal may be a digital file representing a spectral response or temporal response. The spectral response may be an indication of how the audio signal captured by the microphone array and the improved audio signal varies with frequency. A power spectral density is an example representation of the spectral response. The temporal response may be an indication of how the audio signal and the improved audio signal changes within the room. The change may be characterized as a reverberation, delay, decay, or phase change of the audio signal. Additionally, or alternatively, the audio signal and improved audio signal may be represented as a set of impulse responses or bi-quad filter coefficients representative of the audio signal, among others.

In the case of the audio signal being represented as impulse responses, the signal to noise ratio of the improved audio signal may be calculated by dividing the impulse response of the improved audio signal with the received audio signal. As yet another example, the beamforming method may define a probability density function which indicates a likelihood that the sonic input the audio signal originates in a particular direction. An integral of the probability density function may be indicative of a signal to noise ratio of the improved audio signal. Still alternatively, the signal to noise ratio may be based on determining for the probability density function those directions where a first derivative of the likelihood is maximized, and integrating those regions to calculate the signal to noise ratio for the improved audio signal. Other arrangements are also possible for calculating a signal to noise ratio.

At least one signal to noise ratio or a plurality of signal to noise ratios may be associated with a microphone array. For example, the echo cancellation algorithm provides an improved audio signal based on the audio signal received by the microphone array. The signal to noise ratio of this improved audio signal may be calculated and associated with the microphone array. As another example, beamforming may be performed in a plurality of directions to improve an an audio signal received in a particular direction. The signal to noise ratio of this improved audio signal with respect to direction may be calculated and associated with the microphone array. For example, the audio signal may be processed at directions of 20 degree angular intervals around the microphone array. Each 20 degree angular interval may have associated impulse response of the received audio signal, impulse response of the improved audio signal, and signal to noise ratio.

Figure 8:
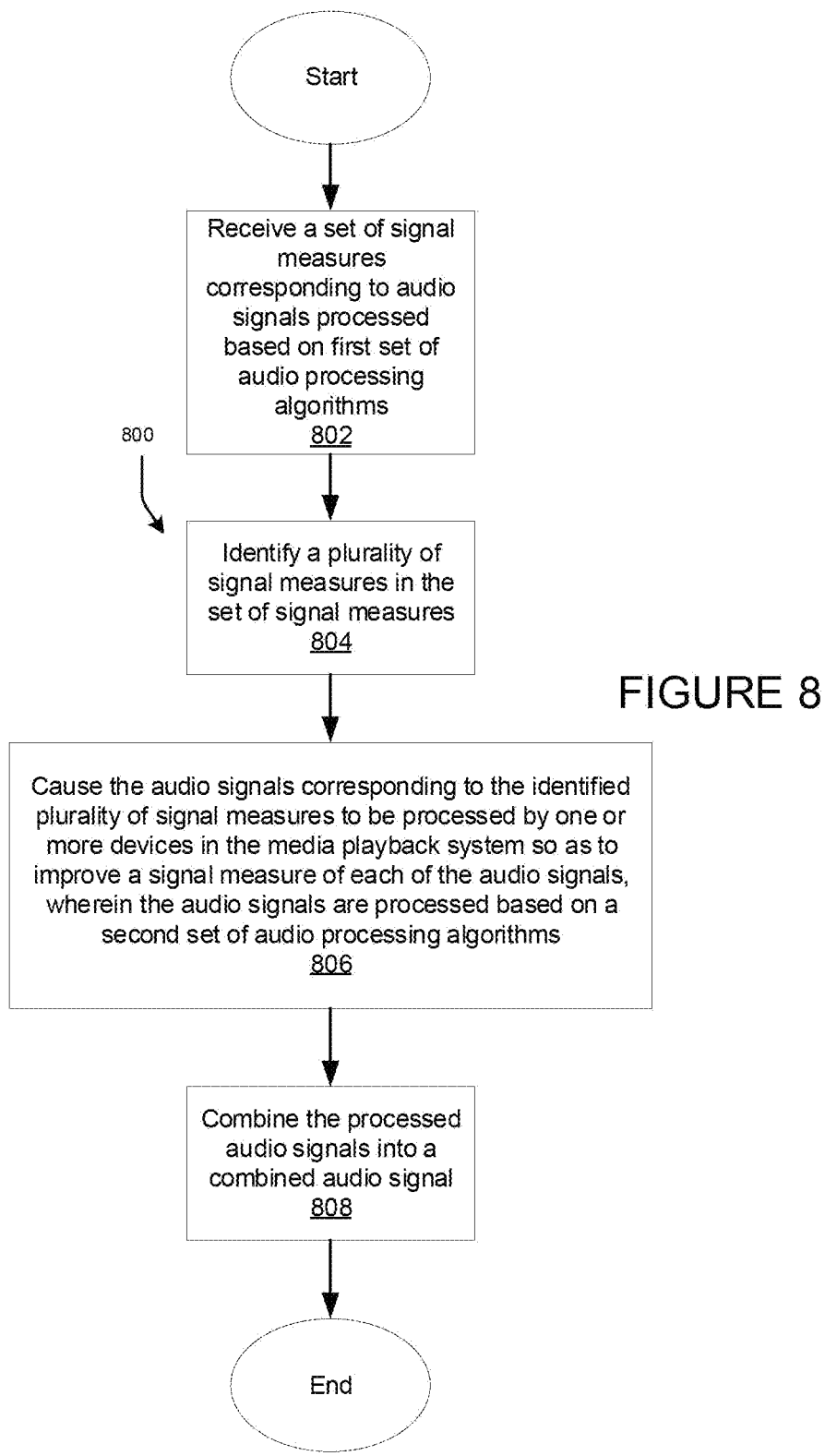
FIG. 8 shows an example flow diagram associated with distributing processing across devices in a media playback system.
Figure 9:
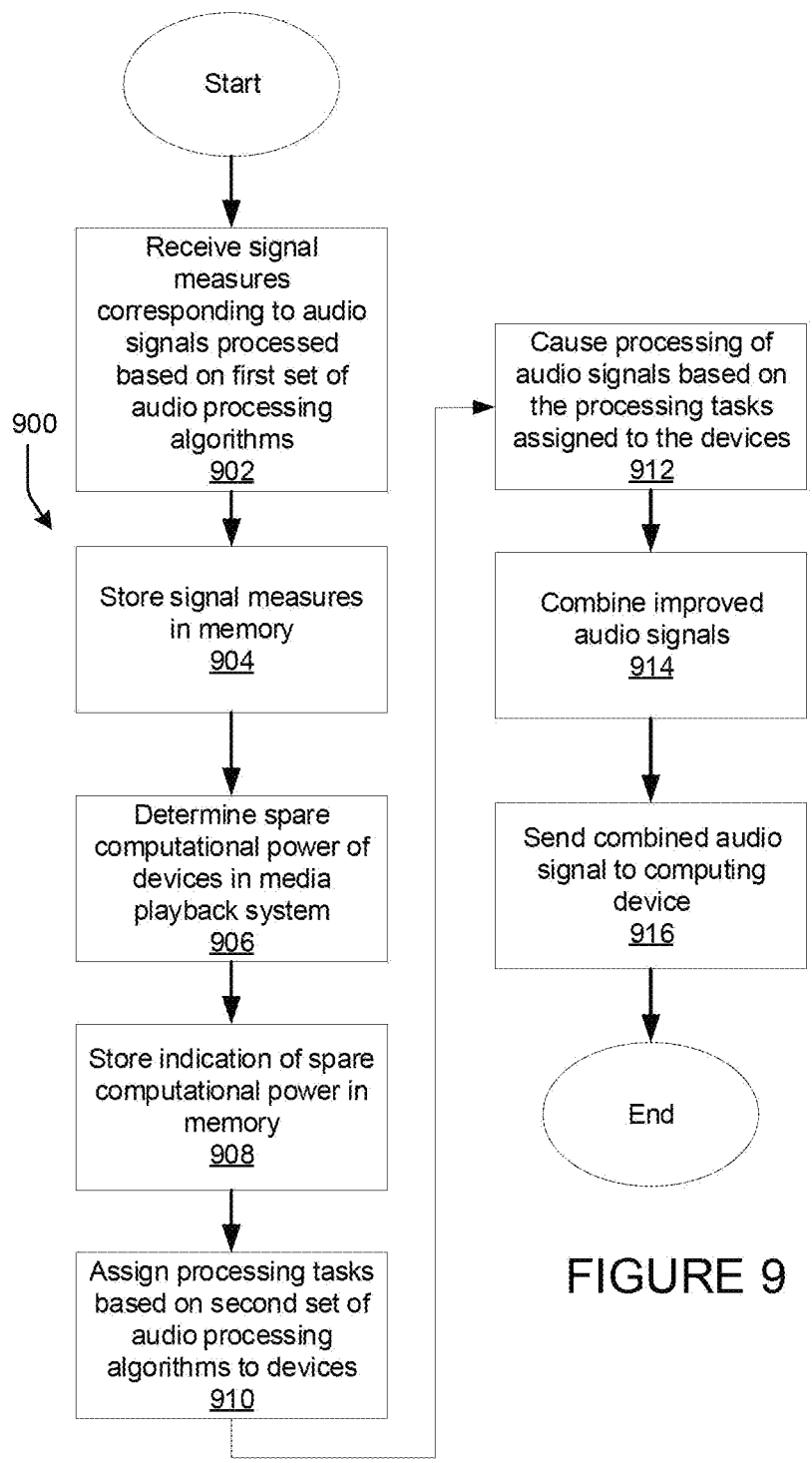
FIG. 9 shows a more detailed example flow diagram associated with distributing processing across devices in the media playback system.

FIGS. 8 and 9 present respective embodiments that can be implemented within the disclosed operating environment. Methods and the other process disclosed herein may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in the figures may represent circuitry that is wired to perform the specific logical functions in the process.

FIG. 8 is a flow chart 800 of functions associated with distributed processing to improving a signal measure, e.g., signal to noise ratio, of an audio signal received by a plurality of devices in a media playback system. In one example, the disclosed functions may be coordinated and at least partially performed by a playback device, such as one of the one or more playback devices in the media playback system. In another example, the disclosed functions may be coordinated and at least partially performed by a computing device. In yet another example, the functions may be coordinated and at least partially performed by a controller device. In another example, the disclosed functions may be coordinated and at least partially performed by a NMD. Other arrangements are also possible.

Referring to FIG. 8, at 802, a set of signal measures corresponding to audio signals processed based on first set of audio processing algorithms may be received. At 804, a plurality of signal measures in the set of signal measures may be identified. Then, at 806, the audio signals corresponding to the identified plurality of signal measures may be processed by one or more devices in the media playback system based on a second set of audio processing algorithms. Additionally, the audio signals may be processed based on spare computational power of a device of the one or more devices. At 808, the processed audio signals may be combined to produce a combined audio signal. The combined audio signal may have an improved signal measure such as a signal to noise ratio as compared to the audio signals processed at 802 and at 806. This improved signal measure allows for improved recovery of a sonic input of the audio signal so that, for instance, in the case that the sonic input is a voice input, a server arranged with voice processing capabilities may be able to interpret the voice input and perform a function associated with the voice input.

The functions of the example process shown in FIG. 8 will now be described in more detail.

Starting at 802, a set of signal measures corresponding to audio signals processed based on a first set of audio processing algorithms may be received. The playback device, controller device, and/or NMD of the media playback system may each receive one or more audio signals. A first set of audio processing algorithms may be applied to an audio signal received by a device to improve a signal to noise ratio of the audio signal. The first set of audio algorithms may be the echo cancellation method, beamforming method and/or subtraction of known signal method for a particular resolution. For example, the first set of audio processing algorithms may process impulse responses in a certain window size, e.g., 100 ms, or a certain angular interval of an angular range, e.g., 20 degrees over a 100 degree range. In some embodiments, the window sand/or angular interval size that is processed may be limited by available processing power of the playback device, controller device, NMD, or computing device that processes the audio signal. As a result of the processing, one or more signal measures may be associated with each device. The signal measure may be a signal to noise ratio also determined by the playback device, controller device, NMD, or computing device the processed audio signal. The one or more signal measures from each device in the media playback system may define a set of signal measures. For example, the set of signal measures may include the signal to noise ratio associated with a microphone array of a device or the signal to noise ratio associated with receiving an audio signal in a certain direction.

At 804, a plurality of signal measures in the set of signal measures may be identified. For example, the plurality of signal measures may be those signal measures, e.g., signal to noise ratio, which are the highest and/or those signal measures which are the lowest.

Then, at 806, the audio signals corresponding to the identified plurality of signal measures may be processed by one or more devices in the media playback system so as to improve a signal measure of each of the audio signals. The audio signals may be processed based on a second set of audio processing algorithms.

The audio signal may be processed based on the second set of audio processing algorithms to improve a signal to noise ratio. The second set of audio processing algorithms may be one or more of the echo cancellation algorithm, beamforming algorithm, or known signal subtraction algorithm, for instance, performed with a higher resolution. The higher resolution may be, for example, processing impulse responses in a larger window size, e.g., 200 ms vs. 100 ms as compared to the first set of audio processing algorithms, a smaller angular interval, e.g., 5 degree intervals vs. 20 degree intervals as compared to the first set of audio processing algorithms, or a larger angular range, e.g., a 200 degree range vs. a 100 degree range as compared to the first set of audio processing algorithms.

The devices in the media playback system have one or more processors. The one or more processors may have a maximum computational power. The maximum computational power is the power available to perform functions associated with device. In the case of the controller device, the maximum computational power may be characterized as available clock cycles to process and playback the audio signal control the playback devices. In the case of the server, the maximum computational power may be characterized as available clock cycles to source audio content to the playback devices. In the case of the playback device, the maximum computational power may be characterized as available clock cycles to play back audio content. The spare computational power may be that computational power beyond what may be needed to perform functions of the device, such as to play back the audio in the case of a playback device or control playback devices in the case of a controller device.

The higher resolution processing requires more computational power than the first set of audio processing algorithms. In this regard, the audio signals may be processed in a distributed manner across one or more devices in the media playback system based on the spare computational power available of a device to improve the signal to noise ratio beyond that of the first set of audio processing algorithms. By using the spare computational power, performance of the media playback system does not degrade with the additional processing associated with improving the signal to noise ratio of the audio signal. The audio signals may be distributed based on other criteria as well such as a speed of a processor of a device.

At 808, the processed audio signals may be combined into a combined audio signal. In some embodiments, the combined audio signal may be provided to the server to recover the sonic input of the audio signal.

FIG. 9 is a flow chart 900 of functions that describes in more detail the functions recited in FIG. 8 that may be performed in the distributed processing described in FIG. 8. In embodiments, these functions may be performed by the computing device but could be performed by a playback device, controller, and/or NMD.

At 902, the signal measures corresponding to the audio signals processed by devices in the media playback system may be received. For example, the playback device, NMD, and controller device may apply an audio processing algorithms to the audio signal or audio signals that are received by the device. The audio processing algorithm that is applied may be based on a first set of audio processing algorithms. In one example, the computing device may have a network interface and communication links that communicatively couple the computing device to the playback device, NMD, and controller device to receive the signal measure or signal measures that is determined by each device. In another example, the computing device instead of the device which receives the audio signal may receive the audio signal from a device, apply the audio processing algorithms and/or determine a signal measure. Other arrangements are also possible.

At 904, the signal measures may be stored in memory. The computing device may receive for each signal measure an indication of the microphone array of the device associated with the signal measure, an indication of the device associated with the signal measure, and/or an indication of a direction associated with the signal measure. The signal measures stored in memory may be further associated with one or more of these indications.

Figure 10:
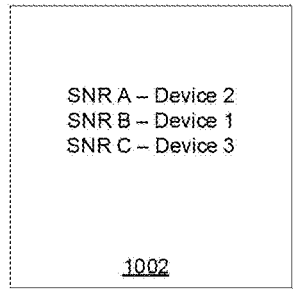
FIG. 10 shows example tables for managing signal measures of audio signals and spare computational power of devices in the media playback system.
Figure 10:
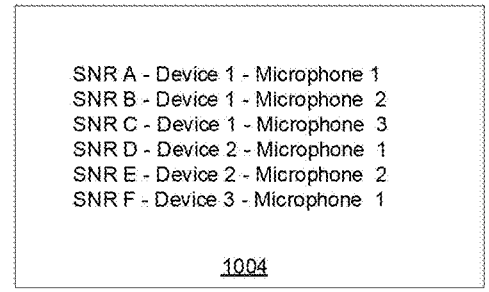
Figure 10:
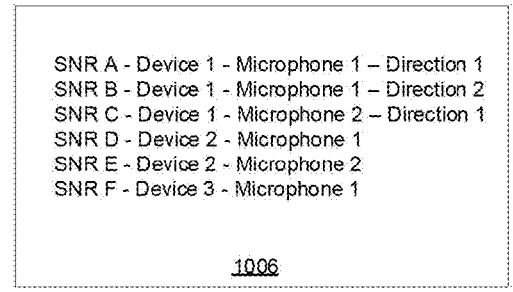
Figure 10:
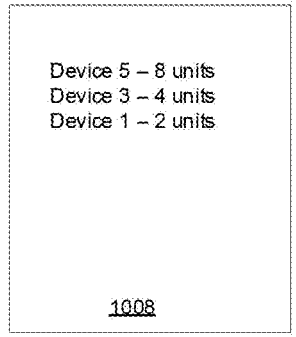

FIG. 10 illustrates various examples of storing the signal measures in memory. In embodiments, the signal measures may be stored in the form a table. If each device in the media playback system has one microphone array, the signal measures may be stored in table 1002 which identifies the signal to noise ratio for each device/microphone array. The table 1002 may be a two-dimensional matrix with each row having a signal to noise ratio and each column identifying the device/microphone array. If a device in the media playback system has one or more microphone arrays, then the signal measures may be stored in a table 1004 which identifies the signal to noise ratio for each microphone array on each device. The table 1004 may be a two-dimensional matrix with each row identifying the signal to noise ratios for each microphone array. If the signal to noise ratio is directional, e.g., determined by a beamforming algorithm, then the signal measure may be stored in a table 1006, e.g., two-dimensional matrix, which identifies the signal to ratio for a particular direction. The table could also have a third dimension which identifies the particular device or microphone array associated with the signal to noise ratio for a direction and/or microphone array, rather than included in one of the two dimensions of the table. The table may take other forms as well depending on the arrangement of the devices in the media playback system and based on the processing algorithms used to determine the signal to noise ratio.

The table may also be sorted such that the first entry in the table may identify the highest signal measure, e.g., signal to noise ratio, for the audio signal received by a microphone array and the last entry may identify the lowest signal measure, e.g., signal to noise ratio, for the audio signal received by a microphone array. In the case of the example tables 1002-1006 of FIG. 10, SNR A may represent a highest signal to noise measure and SNR F may represent a lowest signal to noise measure. The table, and for this matter how the signal measures are stored in memory, may take other forms as well depending on the arrangement of the devices in the media playback system and based on the processing algorithms used to determine the signal measure. For example, the table may also be sorted based on the signal to noise ratios meeting a threshold level.

At 906, the computing device may determine the spare computational power of the devices in the media playback system. Each device may indicate its spare computational power to a given device, such as a playback device, controller device, or server. In one example, the media playback may define a state variable indicative of an amount of spare computational power associated with a device. This state variable may be periodically updated and made available to the devices in the media playback system. In some embodiments, the state variable may take the form of a flag which indicates that it has a spare computational power.

Various types of flags may be set depending on an amount of spare computational power available. The flag may take the form of one or more bits that are set on the device or some other device to indicate that the device has spare computational power. For instance, "000" may indicate that the playback device has 50K clock cycles of computational power and "111" may indicate that the playback device has 1000K clock cycles of computational power. Based on the state variable, a given device, e.g., computing device, in the media playback system may obtain the spare computational power for each device and generate a table that identifies for each device its spare processing power. For example, the given device may read the bits associated with the flag to determine the spare computational power associated with a particular device in the media playback system.

At 908, an indication of the spare computational power of the devices may be stored in memory. The spare computational power may be further associated with the indication of the device that has the spare computational power.

FIG. 10 illustrates an example of storing the computational power in memory. The computational power may be stored in the form a table 1008. The table 1008 may identify a spare computational power and a device in the media playback system having the spare computational power. Further, the table may be ordered such that a first entry in the table identifies a device with a highest spare computational power in the media playback system and a last entry in the table identifies a device with a lowest spare computational power in the media playback system. In this regard, table 1008 indicates that device 5 has the highest spare computational power of 8 units and device 1 has the lowest spare computational power of 2 units. The units may represent a certain amount of available clock cycles for a processor. The table may store indications other than spare computational power as well so long as spare computational power may be determined from the stored indication.

At 910, processing tasks are assigned to the devices identified in the table determined at 908 so as to improve the signal to noise ratio of the processed audio signals. The processing tasks may be associated with a second set of audio processing algorithms, and may include one or more of a higher resolution echo cancellation, beamforming method, and/or subtraction of known signal method. The echo cancellation method and the subtraction of known signal methods may be higher resolution because a longer impulse response of the audio signal is processed as compared the signal measures processed with the first set of signal improvement algorithms. The processing over a longer impulse results in an improved identification and cancellation of echoes and noise. The beamforming may be higher resolution because the audio signal is processed in smaller angular intervals and/or over a greater number of directions. For example, the audio signal is processed at 5 degree intervals rather than 20 degree intervals for a 200 degree angular range rather than a 100 degree angular range. Other arrangements are also possible.

The processing tasks may be assigned to devices based on available spare processing power available in the media playback system. The echo cancellation and beamforming may require a certain computational power to be performed. Further, the computational power for performing echo cancellation may be less than that for performing beamforming to improve a signal to noise ratio. Accordingly, processing tasks may be assigned based on what spare computational power is available on a device (e.g., a threshold level) and the computational power needed for a processing task. For example, using table 1008, the processing tasks requiring the most computational power may be assigned to the device with highest available spare processing power, and then the processing task requiring the next most computational power may be assigned to the device with the next highest available spare processing power etc. As another example, processing tasks associated with only the echo cancellation algorithm may be assigned to all of the devices in the media playback system if the spare computational power across all device is low but enough to support echo cancellation. As yet another example, processing tasks associated with both the beamforming algorithm and echo cancellation may be assigned if the spare computational power across all device high and enough to support both algorithms. In yet another example, some devices may be assigned a processing task of echo cancellation and other devices may be assigned a processing task of beamforming depending on each individual spare processing power. Other arrangements are also possible.

In some embodiments, a total spare processing power available (e.g., sum of spare processing power for each device) may be less than what is needed to process all of the audio signals that are received by the devices in the media playback system with desired processing algorithms. In this situation, the processing tasks may be assigned based on goals as a result of the audio signal processing. For example, a decision may be made that a high signal to noise ratio is desired for the audio signals that are received from some of the devices. If a high signal to noise ratio is desired, then processing tasks such as both the beamforming algorithm and echo cancellation may be assigned to the one or more devices. On the other hand, a decision may be made that a lower signal to noise ratio is acceptable so that audio signals that are received from all or many of the devices are processed. If the lower signal to noise ratio is acceptable, then processing tasks that use low computational power such as only echo cancellation may be assigned to the one or more devices.

The processing tasks may be assigned until the spare computational resources is exhausted, or some threshold level of spare computational resources remain for a device or across all devices. Alternatively, the processing tasks may be assigned across the devices so that the spare computational power is reduced across all devices in proportion. Other arrangements are also possible.

At 912, certain of the audio signals identified by corresponding signal measures may be processed. The processing may be based on the processing tasks assigned to the devices to result in improved audio signals. For example, the audio signal for the device, microphone array, or direction of the microphone array that has the highest signal to noise ratio as defined by the table of signal to noise ratios may be assigned to the device with the highest spare processing power for processing. Then, the audio signal associated with the next highest signal to noise ratio may be assigned to the device with the next highest signal to noise ratio for processing until all desired audio signals are assigned to the devices associated with processing tasks. By assigning processing tasks in this manner, the overall performance of the media playback device does not degrade because the processing is performed based on spare processing power and not processing power which would otherwise be used to play back audio.

Other arrangements are also possible for assigning the audio signals to be processed. For instance, a user may specify that certain audio signals may be processed based on knowledge of a relationship between the audio source and microphone array. For instance, if it is known that the sonic input is received directly the microphone array, then the audio signal should be processed regardless of the actual signal to noise ratio of the audio signal. Similarly, if it is known, that if the sonic input is received indirectly by the microphone array, then the audio signal should not be processed further regardless of the signal to noise ratio of the audio signal.

The audio signals processed by each device result in an improved audio signal with a higher signal to noise ratio than what was determined by the first set of audio processing algorithms. The improved audio signal may also be weighted based on a confidence or likelihood that the improved audio signal accurately represents the sonic input. For example, the improved audio associated with a certain direction may be weighed more heavily than the improved audio associated with another direction if the likelihood is higher that the sonic input is coming from the certain directions. As another example, the improved audio signal of one device may be weighted heavier than the improved audio signals of another device if one device is closer to the sonic input than the other device. Other arrangements are also possible.

At 914, the improved audio signals (with or without weighing) may be combined to form a combined audio signal. By combining the improved audio signals, noise is cancelled resulting in a combined audio signal with a higher signal to noise ratio than any of the improved audio signals making up the combined audio signal. At 916, this combined audio signal may be then passed to a computing device such as a server. In the event that the audio signal has a voice input, the computing device may attempt to interpret the voice input to determine a function associated with the voice input.

Methods and the other process disclosed herein may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in the figures may represent circuitry that is wired to perform the specific logical functions in the process.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A first playback device comprising:
at least one processor;
one or more microphones;
at least one non-transitory computer-readable medium; and
program instructions stored on the at least one non-transitory computer-readable medium that are executable by the at least one processor such that the first playback device is configured to:
receive, via the one or more microphones, a set of voice signals;
process the set of voice signals using a first set of audio processing algorithms to determine a set of signal measures corresponding to the set of voice signals;
identify, from the set of voice signals, at least one voice signal that is to be processed with a second set of audio processing algorithms;
determine that a respective amount of available computational power of at least a second playback device does not exceed an amount of available computational power of the first playback device; and
based on determining that the respective amount of available computational power of at least the second playback device does not exceed the amount of available computational power of the first playback device, process the at least one voice signal using the second set of audio processing algorithms.

2. The first playback device of claim 1, further comprising program instructions that are executable by the at least one processor such that the first playback device is configured to:
based on processing the at least one voice signal using the second set of audio processing algorithms, determine that the at least one voice signal includes an indication of a command related to media playback.

3. The first playback device of claim 2, further comprising program instructions that are executable by the at least one processor such that the first playback device is configured to:
execute the command related to media playback.

4. The first playback device of claim 1, further comprising program instructions that are executable by the at least one processor such that the first playback device is configured to:
receive an indication of the respective amount of available computational power of at least the second playback device from a network device.

5. The first playback device of claim 1, further comprising program instructions that are executable by the at least one processor such that the first playback device is configured to:

receive an indication of an amount of available computational power of the second playback device from the second playback device.

6. The first playback device of claim 1, wherein a resolution of the first set of audio processing algorithms is lower than a resolution of the second set of audio processing algorithms.

7. The first playback device of claim 1, wherein the program instructions that are executable by the at least one processor such that the first playback device is configured to process the set of voice signals using the first set of audio processing algorithms comprise program instructions that are executable by the at least one processor such that the first playback device is configured to process the set of voice signals using the first set of audio processing algorithms based on determining that the respective amount of available computational power of at least the second playback device does not exceed the amount of available computational power of the first playback device.

8. The first playback device of claim 1, further comprising program instructions that are executable by the at least one processor such that the first playback device is configured to:
based on a signal measure of the determined set of signal measures that corresponds to the at least one voice signal, determine that the at least one voice signal is to be processed with the second set of audio processing algorithms.

9. The first playback device of claim 1, further comprising program instructions that are executable by the at least one processor such that the first playback device is configured to:
based on a predetermined characteristic of the at least one voice signal, determine that the at least one voice signal is to be processed with the second set of audio processing algorithms.

10. The first playback device of claim 1, wherein the program instructions that are executable by the at least one processor such that the first playback device is configured to determine that the respective amount of available computational power of at least the second playback device does not exceed the amount of available computational power of the first playback device comprise program instructions that are executable by the at least one processor such that the first playback device is configured to:
determine that an amount of available computational power of the second playback device does not exceed the amount of available computational power of the first playback device; and
determine that an amount of available computational power of a computing device does not exceed the amount of available computational power of the first playback device.

11. A non-transitory computer-readable medium, wherein the non-transitory computer-readable medium is provisioned with program instructions that, when executed by at least one processor, cause a first playback device to:
receive, via one or more microphones of the first playback device, a set of voice signals;
process the set of voice signals using a first set of audio processing algorithms to determine a set of signal measures corresponding to the set of voice signals;
identify, from the set of voice signals, at least one voice signal that is to be processed with a second set of audio processing algorithms;
determine that a respective amount of available computational power of at least a second playback device does not exceed an amount of available computational power of the first playback device; and
based on determining that the respective amount of available computational power of at least the second playback device does not exceed the amount of available computational power of the first playback device, process the at least one voice signal using the second set of audio processing algorithms.

12. The non-transitory computer-readable medium of claim 11, wherein the non-transitory computer-readable medium is also provisioned with program instructions that, when executed by at least one processor, cause the first playback device to:
based on processing the at least one voice signal using the second set of audio processing algorithms, determine that the at least one voice signal includes an indication of a command related to media playback.

13. The non-transitory computer-readable medium of claim 12, wherein the non-transitory computer-readable medium is also provisioned with program instructions that, when executed by at least one processor, cause the first playback device to:
execute the command related to media playback.

14. The non-transitory computer-readable medium of claim 11, wherein the non-transitory computer-readable medium is also provisioned with program instructions that, when executed by at least one processor, cause the first playback device to:
receive an indication of the respective amount of available computational power of at least the second playback device from a network device.

15. The non-transitory computer-readable medium of claim 11, wherein the non-transitory computer-readable medium is also provisioned with program instructions that, when executed by at least one processor, cause the first playback device to:
receive an indication of an amount of available computational power of the second playback device from the second playback device.

16. The non-transitory computer-readable medium of claim 11, wherein a resolution of the first set of audio processing algorithms is lower than a resolution of the second set of audio processing algorithms.

17. The non-transitory computer-readable medium of claim 11, wherein the program instructions that, when executed by at least one processor, cause the first playback device to process the set of voice signals using the first set of audio processing algorithms comprise program instructions that, when executed by at least one processor, cause the first playback device to process the set of voice signals using the first set of audio processing algorithms based on determining that the respective amount of available computational power of at least the second playback device does not exceed the amount of available computational power of the first playback device.

18. The non-transitory computer-readable medium of claim 11, wherein the non-transitory computer-readable medium is also provisioned with program instructions that, when executed by at least one processor, cause the first playback device to:
based on a signal measure of the determined set of signal measures that corresponds to the at least one voice signal, determine that the at least one voice signal is to be processed with the second set of audio processing algorithms.

19. The non-transitory computer-readable medium of claim 11, wherein the non-transitory computer-readable medium is also provisioned with program instructions that, when executed by at least one processor, cause the first playback device to:
- based on a predetermined characteristic of the at least one voice signal, determine that the at least one voice signal is to be processed with the second set of audio processing algorithms.

20. A method carried out by a first playback device, the method comprising:
- receiving, via one or more microphones, a set of voice signals;
- processing the set of voice signals using a first set of audio processing algorithms to determine a set of signal measures corresponding to the set of voice signals;
- identifying, from the set of voice signals, at least one voice signal that is to be processed with a second set of audio processing algorithms;
- determining that a respective amount of available computational power of at least a second playback device does not exceed an amount of available computational power of the first playback device; and
- based on determining that the respective amount of available computational power of at least the second playback device does not exceed the amount of available computational power of the first playback device, processing the at least one voice signal using the second set of audio processing algorithms.

* * * * *